(12) United States Patent
Zhu et al.

(10) Patent No.: US 12,267,883 B2
(45) Date of Patent: Apr. 1, 2025

(54) SESSION MANAGEMENT METHOD AND SYSTEM, AND DEVICE

(71) Applicant: HUAWEI TECHNOLOGIES CO., LTD., Shenzhen (CN)

(72) Inventors: Qianghua Zhu, Beijing (CN); Wenfu Wu, Shanghai (CN); Qi Yao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 776 days.

(21) Appl. No.: 16/944,691

(22) Filed: Jul. 31, 2020

(65) Prior Publication Data

US 2020/0367296 A1 Nov. 19, 2020

Related U.S. Application Data

(63) Continuation of application No. PCT/CN2019/072119, filed on Jan. 17, 2019.

(30) Foreign Application Priority Data

Feb. 2, 2018 (CN) .......................... 201810108388.5

(51) Int. Cl.
*H04W 76/10* (2018.01)
*H04L 67/14* (2022.01)
(Continued)

(52) U.S. Cl.
CPC ............. *H04W 76/10* (2018.02); *H04L 67/14* (2013.01); *H04W 60/00* (2013.01); *H04L 2101/622* (2022.05)

(58) Field of Classification Search
CPC .............. H04W 76/10; H04W 47/2408; H04L 12/4641; H04L 45/745
See application file for complete search history.

(56) References Cited

U.S. PATENT DOCUMENTS

2005/0286503 A1* 12/2005 Oda .................. H04L 61/50
370/395.2
2008/0091814 A1* 4/2008 Xie .................. H04L 67/143
709/223
(Continued)

FOREIGN PATENT DOCUMENTS

CN 101030966 A 9/2007
CN 101047695 A 10/2007
(Continued)

OTHER PUBLICATIONS

Korean Notice of Preliminary Rejection issued in corresponding Korean Patent Application No. 10-2020-7023881, dated Jul. 1, 2021, pp. 1-10.
(Continued)

*Primary Examiner* — Sulaiman Nooristany
(74) *Attorney, Agent, or Firm* — HAUPTMAN HAM, LLP

(57) ABSTRACT

A session management method includes obtaining, by a terminal, terminal media access control (MAC) address information related to an existing Ethernet session of the terminal. The method also includes determining, by the terminal based on the terminal MAC address information related to the existing Ethernet session of the terminal, that a new Ethernet session needs to be established for the terminal. The method further includes initiating, by the terminal, establishment of the new Ethernet session for the terminal.

12 Claims, 10 Drawing Sheets

(51) Int. Cl.
  *H04W 60/00* (2009.01)
  *H04L 101/622* (2022.01)

(56) References Cited

U.S. PATENT DOCUMENTS

| | | | |
|---|---|---|---|
| 2015/0188951 A1 | 7/2015 | Lee et al. | |
| 2015/0256546 A1* | 9/2015 | Zhu | H04L 63/08 726/4 |
| 2016/0036854 A1* | 2/2016 | Himawan | H04L 63/20 726/5 |
| 2018/0302773 A1 | 10/2018 | Jiao | |

FOREIGN PATENT DOCUMENTS

| | | | |
|---|---|---|---|
| CN | 104144157 A | 11/2014 | |
| CN | 106304395 A | 1/2017 | |
| CN | 106686676 A | 5/2017 | |
| JP | 2010507293 A | 3/2010 | |
| KR | 20110036805 A | 4/2011 | |
| WO | 2014189290 A2 | 11/2014 | |
| WO | 2016150817 A1 | 9/2016 | |

OTHER PUBLICATIONS

Huawei et al., "Clarification on Ethernet PDU session",SA WG2 Meeting #123 S2-178105, Oct. 23-27, 2017, Total 10 Pages.

Japanese Notice of Allowance issued in corresponding Japanese Application No. 2020-541918, dated Sep. 21, 2021, pp. 1-4.

S2-180689 CATT, "Multi-access PDU session support for Non-IP type PDU sessions",SA WG2 Meeting #125,Jan. 22 26, 2018, Gothenburg, Sweden, total 3 pages.

3GPP TS 23.501 V15.0.0 (Dec. 2017), 3rd Generation Partnership Project; Technical Specification Group Services and System Aspects-;System Architecture for the 5G System;Stage 2(Release 15),total 181 pages.

International Search Report issued in corresponding International Application No. PCT/CN2019/072119, mailed Apr. 8, 2019, State Intellectual Property Office of the P.R. of China, Beijing, China.

Chinese Office Action issued in corresponding Chinese Application No. 201810108388.5, mailed Mar. 16, 2020, State Intellectual Property Office of the P.R. of China, Beijing, China.

European Search Report issued in corresponding European Patent Application No. 19747771.4, mailed Dec. 3, 2020, pp. 1-7, European Patent Office, Munich, Germany.

* cited by examiner

SESSION MANAGEMENT METHOD AND SYSTEM, AND DEVICE

CROSS-REFERENCE TO RELATED APPLICATIONS

This application is a continuation of International Patent Application No. PCT/CN2019/072119, filed on Jan. 17, 2019, which claims priority to Chinese Patent Application No. 201810108388.5, filed on Feb. 2, 2018. The disclosures of the aforementioned applications are hereby incorporated by reference in their entireties.

TECHNICAL FIELD

This application relates to the field of communications technologies, and in particular, to a session management method and system, and a device.

BACKGROUND

To address challenges from wireless broadband technologies and keep the leading edge of a 3rd generation partnership project (3GPP) network, the 3GPP standards organization formulates, at the end of 2016, a network architecture of a next generation mobile communications system (next generation system), which is referred to as a 5th generation (5G) network architecture.

The current 5G network architecture supports three types of sessions: an internet protocol (IP) session, an Ethernet session, and an unstructured session. In a process of establishing each Ethernet session for a terminal, a communication address of the terminal is not assigned in a 5G network. In other words, a terminal IP address and a terminal media access control (MAC) address are not assigned. Instead, a session management function (SMF) network element in the 5G network architecture obtains an available terminal MAC address list from a data network (DN)-authentication, authorization, and accounting (AAA) server, and sets a filtering rule (filtering rule) of a user plane function (UPF) network element based on the available terminal MAC address list. Further, if the UPF network element detects that a terminal MAC address in a received data packet is not in the terminal MAC address list available for an existing Ethernet session of the terminal, the UPF network element discards the data packet.

However, due to a code limitation or a standard definition limitation on the Ethernet session, a single Ethernet session supports a limited quantity of terminal MAC addresses. For example, as defined in the standard, a quantity of terminal MAC addresses in the available terminal MAC address list obtained for a single Ethernet session from the DN-AAA server does not exceed 16. However, a terminal MAC address supported by the terminal is not definite. For example, a quantity of terminal MAC addresses supported by the terminal may exceed a quantity of terminal MAC addresses in the terminal MAC address list available for the existing Ethernet session of the terminal. Alternatively, the terminal MAC address supported by the terminal may not be in the terminal MAC address list available for the existing Ethernet session of the terminal. In this case, there is no related solution currently.

SUMMARY

Embodiments of this application provide a session management method and system, and a device, to resolve a current problem that a single Ethernet session of a terminal supports a limited quantity of terminal MAC addresses but a terminal MAC address supported by the terminal is not definite.

To achieve the foregoing objective, the following technical solutions are used in the embodiments of this application.

According to a first aspect, a session management method is provided, where the method includes: obtaining, by a terminal, terminal media access control MAC address information related to an existing Ethernet session of the terminal; determining, by the terminal based on the terminal MAC address information related to the existing Ethernet session of the terminal, that a new Ethernet session needs to be established for the terminal; and initiating, by the terminal, establishment of a new Ethernet session for the terminal. Based on the solution, a current problem that a single Ethernet session of the terminal supports a limited quantity of terminal MAC addresses but a terminal MAC address supported by the terminal is not definite can be resolved.

In a possible design, the terminal MAC address information related to the existing Ethernet session of the terminal includes: a terminal MAC address list that has been bound to the existing Ethernet session of the terminal and a quantity of terminal MAC addresses that can be bound to the existing Ethernet session of the terminal; and the determining, by the terminal based on the terminal MAC address information related to the existing Ethernet session of the terminal, that a new Ethernet session needs to be established for the terminal includes: determining, by the terminal, that a quantity of terminal MAC addresses in the terminal MAC address list that has been bound to the existing Ethernet session of the terminal is equal to the quantity of terminal MAC addresses that can be bound to the existing Ethernet session of the terminal. Based on the solution, the terminal may determine that a new Ethernet session needs to be established for the terminal.

In a possible design, the obtaining, by a terminal, a quantity of terminal MAC addresses that can be bound to the existing Ethernet session of the terminal includes: obtaining, by the terminal, a preconfigured quantity of terminal MAC addresses that can be bound to the existing Ethernet session of the terminal. In other words, the terminal may preconfigure a quantity of terminal MAC addresses that can be bound to an Ethernet session of the terminal, and the quantity of terminal MAC addresses that can be bound to the Ethernet session of the terminal may be used as the quantity of terminal MAC addresses that can be bound to the existing Ethernet session of the terminal.

In a possible design, the obtaining, by a terminal, a quantity of terminal MAC addresses that can be bound to the existing Ethernet session of the terminal includes: receiving, by the terminal, a registration accept message from a mobility management network element, where the registration accept message carries the quantity of terminal MAC addresses that can be bound to the existing Ethernet session of the terminal. In other words, the terminal may obtain, by using a registration procedure, the quantity of terminal MAC addresses that can be bound to the Ethernet session of the terminal, and the quantity of terminal MAC addresses that can be bound to the Ethernet session of the terminal may be used as the quantity of terminal MAC addresses that can be bound to the existing Ethernet session of the terminal.

In a possible design, the obtaining, by a terminal, a quantity of terminal MAC addresses that can be bound to the existing Ethernet session of the terminal includes: receiving, by the terminal, a session establishment accept message from a session management network element, where the session establishment accept message carries the quantity of terminal MAC addresses that can be bound to the existing Ethernet session of the terminal. In other words, the terminal may obtain, by using a session establishment procedure, the quantity of terminal MAC addresses that can be bound to the Ethernet session.

In a possible design, the method further includes: obtaining, by the terminal, a terminal MAC address list supported by the terminal; and when the terminal detects a new terminal MAC address, determining, by the terminal, that the new terminal MAC address is in the terminal MAC address list supported by the terminal. Based on the solution, the terminal may determine that the new MAC address of the terminal is valid.

In a possible design, the method further includes: receiving, by the terminal, a terminal MAC address from a network side; and storing, by the terminal, the terminal MAC address from the network side into the terminal MAC address list that has been bound to the existing Ethernet session of the terminal. Based on the solution, the terminal may obtain the terminal MAC address list that has been bound to the existing Ethernet session of the terminal.

In a possible design, the obtaining, by the terminal, a terminal MAC address list supported by the terminal includes: obtaining, by the terminal, a preconfigured terminal MAC address list supported by the terminal. In other words, the terminal may preconfigure the terminal MAC address list supported by the terminal.

In a possible design, the obtaining, by the terminal, a terminal MAC address list supported by the terminal includes: receiving, by the terminal, the registration accept message from the mobility management network element, where the registration accept message carries the terminal MAC address list supported by the terminal. In other words, the terminal may obtain, by using the registration procedure, the terminal MAC address list supported by the terminal.

In a possible design, the terminal MAC address information related to the existing Ethernet session of the terminal includes: a terminal MAC address list available for the existing Ethernet session of the terminal; and the determining, by the terminal based on the terminal MAC address information related to the existing Ethernet session of the terminal, that a new Ethernet session needs to be established for the terminal includes: when the terminal detects a new terminal MAC address, determining, by the terminal, that the new terminal MAC address is not in the terminal MAC address list available for the existing Ethernet session of the terminal. Based on the solution, the terminal may determine that a new Ethernet session needs to be established for the terminal. Based on the solution, the terminal may determine that a new Ethernet session needs to be established for the terminal.

In a possible design, the terminal MAC address information related to the existing Ethernet session of the terminal includes: the terminal MAC address list available for the existing Ethernet session of the terminal and the terminal MAC address list that has been bound to the existing Ethernet session of the terminal; and the determining, by the terminal based on the terminal MAC address information related to the existing Ethernet session of the terminal, that a new Ethernet session needs to be established for the terminal includes: determining, by the terminal, that the terminal MAC address list available for the existing Ethernet session of the terminal is the same as the terminal MAC address list that has been bound to the existing Ethernet session of the terminal. Based on the solution, the terminal may determine that a new Ethernet session needs to be established for the terminal.

In a possible design, the terminal MAC address information related to the existing Ethernet session of the terminal includes: indication information indicating that the terminal MAC address list that has been bound to the existing Ethernet session of the terminal is full. Based on the solution, the terminal may determine that a new Ethernet session needs to be established for the terminal.

Optionally, the obtaining, by a terminal, indication information indicating that the terminal MAC address list that has been bound to the existing Ethernet session of the terminal is full includes: receiving, by the terminal from the session management network element, the indication information indicating that the terminal MAC address list that has been bound to the existing Ethernet session of the terminal is full.

According to a second aspect, a session management method is provided, where the method includes: obtaining, by a session management network element, terminal media access control MAC address information related to an Ethernet session of a terminal; and sending, by the session management network element, the terminal MAC address information related to the Ethernet session of the terminal to the terminal, where the terminal MAC address information related to the Ethernet session of the terminal is used by the terminal to determine whether a new Ethernet session needs to be established for the terminal. Based on the solution, a current problem that a single Ethernet session of the terminal supports a limited quantity of terminal MAC addresses but a terminal MAC address supported by the terminal is not definite can be resolved.

In a possible design, the terminal MAC address information related to the Ethernet session of the terminal includes a terminal MAC address list available for the Ethernet session of the terminal, a quantity of terminal MAC addresses that can be bound to the Ethernet session of the terminal, or indication information indicating that a terminal MAC address list that has been bound to an existing Ethernet session of the terminal is full.

In a possible design, the terminal MAC address information related to the Ethernet session of the terminal includes the quantity of terminal MAC addresses that can be bound to the Ethernet session of the terminal; and the obtaining, by a session management network element, terminal MAC address information related to an Ethernet session of a terminal includes: obtaining, by the session management network element, a local policy, subscription data of the terminal, policy data of the terminal, or data network authentication data of the terminal, where the local policy, the subscription data of the terminal, the policy data of the terminal, or the data network authentication data of the terminal includes the quantity of terminal MAC addresses that can be bound to the Ethernet session of the terminal. Based on the solution, the terminal may obtain the quantity of terminal MAC addresses that can be bound to the Ethernet session of the terminal.

In a possible design, the terminal MAC address information related to the Ethernet session of the terminal includes the terminal MAC address list available for the Ethernet session of the terminal; and the obtaining, by a session management network element, terminal MAC address information related to an Ethernet session of a terminal includes: obtaining, by the session management network element, the data network authentication data of the terminal, where the data network authentication data of the terminal includes the terminal MAC address list available for the Ethernet session of the terminal. Based on the solution, the terminal may obtain the terminal MAC address list available for the Ethernet session of the terminal.

In a possible design, the terminal MAC address information related to the Ethernet session of the terminal includes the indication information indicating that the terminal MAC address list that has been bound to the existing Ethernet session of the terminal is full; and the obtaining, by a session management network element, terminal MAC address information related to an Ethernet session of a terminal includes: receiving, by the session management network element from a user plane function network element, the indication information indicating that the terminal MAC address list that has been bound to the existing Ethernet session of the terminal is full. Based on the solution, the terminal may obtain the indication information indicating that the terminal MAC address list that has been bound to the existing Ethernet session of the terminal is full.

According to a third aspect, a session management method is provided, where the method includes: receiving, by a mobility management network element, a registration request from a terminal; obtaining, by the mobility management network element, at least one of a quantity of terminal media access control MAC addresses that can be bound to an Ethernet session of the terminal or a terminal MAC address list supported by the terminal; and sending, by the mobility management network element, a registration response to the terminal, where the registration response carries at least one of the quantity of terminal MAC addresses that can be bound to the Ethernet session of the terminal or the terminal MAC address list supported by the terminal, the quantity of terminal MAC addresses that can be bound to the Ethernet session of the terminal is used to determine whether a new Ethernet session needs to be established for the terminal, and the terminal MAC address list supported by the terminal is used to determine whether a new terminal MAC address detected by the terminal is valid. Based on the solution, a current problem that a single Ethernet session of the terminal supports a limited quantity of terminal MAC addresses but a terminal MAC address supported by the terminal is not definite can be resolved. Alternatively, based on the solution, the terminal can verify validity of a newly detected MAC address of the terminal.

In a possible design, the obtaining, by the mobility management network element, at least one of a quantity of terminal MAC addresses that can be bound to an Ethernet session of the terminal or a terminal MAC address list supported by the terminal includes: obtaining, by the mobility management network element, at least one of subscription data of the terminal, policy data of the terminal, or data network authentication data of the terminal; and at least one of the subscription data of the terminal, the policy data of the terminal, or the data network authentication data of the terminal includes at least one of the quantity of terminal MAC addresses that can be bound to the Ethernet session of the terminal or the terminal MAC address list supported by the terminal. Based on the solution, the mobility management network element obtains at least one of the quantity of terminal MAC addresses that can be bound to the Ethernet session of the terminal or the terminal MAC address list supported by the terminal.

According to a fourth aspect, a session management method is provided. The method includes: determining, by a user plane function network element, that a terminal media access control MAC address list that has been bound to an existing Ethernet session of a terminal is full; and sending, by the user plane function network element to a session management network element, indication information indicating that the terminal MAC address list that has been bound to the existing Ethernet session of the terminal is full, where the indication information is used to establish a new Ethernet session for the terminal. Based on the solution, a current problem that a single Ethernet session of the terminal supports a limited quantity of terminal MAC addresses but a terminal MAC address supported by the terminal is not definite can be resolved.

In a possible design, the determining, by a user plane function network element, that a terminal MAC address list that has been bound to an existing Ethernet session of a terminal is full includes: determining, by the user plane function network element, that the terminal MAC address list that has been bound to the existing Ethernet session of the terminal is the same as a terminal MAC address list available for the existing Ethernet session of the terminal. Based on the solution, the user plane function network element may determine that the terminal MAC address list that has been bound to the existing Ethernet session of the terminal is full.

In a possible design, before the determining, by a user plane function network element, that a terminal MAC address list that has been bound to an existing Ethernet session of a terminal is full, the method further includes: receiving, by the user plane function network element, a data packet that carries a terminal MAC address; and storing, by the user plane function network element, the terminal MAC address into the terminal MAC address list that has been bound to the existing Ethernet session of the terminal. Based on the solution, the user plane function network element may obtain the terminal MAC address list that has been bound to the existing Ethernet session of the terminal.

According to a fifth aspect, a terminal is provided. The terminal has a function of implementing the method according to any one of the possible designs in the first aspect. The function may be implemented by using hardware, or may be implemented by using hardware executing corresponding software. The hardware or the software includes one or more modules corresponding to the foregoing functions.

According to a sixth aspect, a terminal is provided, including: a processor and a memory. The memory is configured to store a computer-executable instruction. When the terminal runs, the processor executes the computer-executable instruction stored in the memory, and the terminal is enabled to perform the session management method according to any one of the possible designs in the first aspect.

According to a seventh aspect, a terminal is provided, including a processor. The processor is configured to: be coupled to a memory, read an instruction stored in the memory, and then perform, according to the instruction, the session management method according to any one of the possible designs in the first aspect.

According to an eighth aspect, a computer-readable storage medium is provided. The computer-readable storage medium stores an instruction, and when the instruction is run on a computer, the computer is enabled to perform the session management method according to any one of the possible designs in the first aspect.

According to a ninth aspect, a computer program product including an instruction is provided. When the computer program product runs on a computer, the computer is enabled to perform the session management method according to any one of the possible designs in the first aspect.

According to a tenth aspect, a chip system is provided. The chip system includes a processor, configured to support a terminal in implementing a function in the foregoing aspects, for example, determining, based on terminal MAC address information related to an existing Ethernet session of the terminal, that a new Ethernet session needs to be established for the terminal. In a possible design, the chip system further includes a memory. The memory is configured to store a program instruction and data that are necessary for the terminal. The chip system may include a chip, or may include a chip and another discrete component.

For technical effects brought by any one of the designs in the fifth aspect to the tenth aspect, refer to the technical effects brought by different designs in the first aspect. Details are not described herein again.

According to an eleventh aspect, a session management network element is provided. The session management network element has a function of implementing the method according to any one of the possible designs in the first aspect. The function may be implemented by using hardware, or may be implemented by using hardware executing corresponding software. The hardware or the software includes one or more modules corresponding to the foregoing functions.

According to a twelfth aspect, a session management network element is provided, including a processor and a memory. The memory is configured to store a computer-executable instruction. When the session management network element runs, the processor executes the computer-executable instruction stored in the memory, and the session management network element is enabled to perform the session management method according to any one of the possible designs in the second aspect.

According to a thirteenth aspect, a session management network element is provided, including a processor. The processor is configured to: be coupled to a memory, read an instruction stored in the memory, and then perform, according to the instruction, the session management method according to any one of the possible designs in the second aspect.

According to a fourteenth aspect, a computer-readable storage medium is provided. The computer-readable storage medium stores an instruction, and when the instruction is run on a computer, the computer is enabled to perform the session management method according to any one of the possible designs in the second aspect.

According to a fifteenth aspect, a computer program product including an instruction is provided. When the computer program product runs on a computer, the computer is enabled to perform the session management method according to any one of the possible designs in the first aspect.

According to a sixteenth aspect, a chip system is provided. The chip system includes a processor, configured to support a session management network element in implementing a function in the foregoing aspects, for example, obtaining terminal MAC address information related to an Ethernet session of a terminal. In a possible design, the chip system further includes a memory. The memory is configured to store a program instruction and data that are necessary for the session management network element. The chip system may include a chip, or may include a chip and another discrete component.

For technical effects brought by any one of the designs in the eleventh aspect to the sixteenth aspect, refer to the technical effects brought by different designs in the second aspect. Details are not described herein again.

According to a seventeenth aspect, a mobility management network element is provided. The mobility management network element has a function of implementing the method according to any one of the possible designs in the third aspect. The function may be implemented by using hardware, or may be implemented by using hardware executing corresponding software. The hardware or the software includes one or more modules corresponding to the foregoing functions.

According to an eighteenth aspect, a mobility management network element is provided, including a processor and a memory. The memory is configured to store a computer-executable instruction. When the mobility management network element runs, the processor executes the computer-executable instruction stored in the memory, and the mobility management network element is enabled to perform the session management method according to any one of the possible designs in the third aspect.

According to a nineteenth aspect, a mobility management network element is provided, including a processor. The processor is configured to: be coupled to a memory, read an instruction stored in the memory, and then perform, according to the instruction, the session management method according to any one of the possible designs in the third aspect.

According to a twentieth aspect, a computer-readable storage medium is provided. The computer-readable storage medium stores an instruction, and when the instruction is run on a computer, the computer is enabled to perform the session management method according to any one of the possible designs in the third aspect.

According to a twenty-first aspect, a computer program product including an instruction is provided. When the computer program product runs on a computer, the computer is enabled to perform the session management method according to any one of the possible designs in the third aspect.

According to a twenty-second aspect, a chip system is provided. The chip system includes a processor, configured to support a mobility management network element in implementing a function in the foregoing aspects, for example, obtaining at least one of a quantity of terminal MAC addresses that can be bound to an Ethernet session of a terminal or a terminal MAC address list supported by the terminal. In a possible design, the chip system further includes a memory. The memory is configured to store a program instruction and data that are necessary for the mobility management network element. The chip system may include a chip, or may include a chip and another discrete component.

For technical effects brought by any one of the designs in the seventeenth aspect to the twenty-second aspect, refer to the technical effects brought by different designs in the third aspect. Details are not described herein again.

According to a twenty-third aspect, a user plane function network element is provided. The user plane function network element has a function of implementing the method according to any one of the possible designs in the fourth aspect. The function may be implemented by using hardware, or may be implemented by using hardware executing corresponding software. The hardware or the software includes one or more modules corresponding to the foregoing functions.

According to a twenty-fourth aspect, a user plane function network element is provided, including a processor and a memory. The memory is configured to store a computer-executable instruction. When the user plane function network element runs, the processor executes the computer-executable instruction stored in the memory, and the user plane function network element is enabled to perform the session management method according to any one of the possible designs in the fourth aspect.

According to a twenty-fifth aspect, a user plane function network element is provided, including a processor. The processor is configured to: be coupled to a memory, read an instruction stored in the memory, and then perform, according to the instruction, the session management method according to any one of the possible designs in the fourth aspect.

According to a twenty-sixth aspect, a computer-readable storage medium is provided. The computer-readable storage medium stores an instruction, and when the instruction is run on a computer, the computer is enabled to perform the session management method according to any one of the possible designs in the fourth aspect.

According to a twenty-seventh aspect, a computer program product including an instruction is provided. When the computer program product runs on a computer, the computer is enabled to perform the session management method according to any one of the possible designs in the fourth aspect.

According to a twenty-eighth aspect, a chip system is provided. The chip system includes a processor, configured to support a user plane function network element in implementing a function in the foregoing aspects, for example, determining that a terminal MAC address list that has been bound to an existing Ethernet session of a terminal is full. In a possible design, the chip system further includes a memory. The memory is configured to store a program instruction and data that are necessary for the user plane function network element. The chip system may include a chip, or may include a chip and another discrete component.

For technical effects brought by any one of the designs in the twenty-third aspect to the twenty-eighth aspect, refer to the technical effects brought by different designs in the fourth aspect. Details are not described herein again.

According to a twenty-ninth aspect, a session management system is provided, where the session management system includes a session management network element and a terminal. The session management network element is configured to: obtain terminal media access control MAC address information related to an Ethernet session of the terminal, and send the terminal MAC address information related to the Ethernet session of the terminal to the terminal. The terminal is configured to: receive the terminal MAC address information related to the Ethernet session of the terminal from the session management network element, determine, based on the terminal MAC address information related to the Ethernet session of the terminal, that a new Ethernet session needs to be established for the terminal, and then initiate establishment of a new Ethernet session for the terminal. Based on the solution, a current problem that a single Ethernet session of the terminal supports a limited quantity of terminal MAC addresses but a terminal MAC address supported by the terminal is not definite can be resolved.

In a possible design, the session management system further includes a user plane function network element; where the user plane function network element is configured to: determine that a terminal MAC address list that has been bound to the existing Ethernet session of the terminal is full, and then send, to the session management network element, indication information indicating that the terminal MAC address list that has been bound to the existing Ethernet session of the terminal is full. Correspondingly, that the session management network element is configured to obtain terminal MAC address information related to an Ethernet session of the terminal includes: receiving, from the user plane function network element, the indication information indicating that the terminal MAC address list that has been bound to the existing Ethernet session of the terminal is full. Based on the solution, the terminal may obtain the indication information indicating that the terminal MAC address list that has been bound to the existing Ethernet session of the terminal is full.

According to a thirtieth aspect, a session management system is provided, where the session management system includes a mobility management network element and a terminal. The mobility management network element is configured to: receive a registration request from the terminal, obtain a quantity of terminal media access control MAC addresses that can be bound to an Ethernet session of the terminal, and then send a registration response to the terminal, where the registration response carries the quantity of terminal MAC addresses that can be bound to the Ethernet session of the terminal. The terminal is configured to: receive, from the mobility management network element, the quantity of terminal MAC addresses that can be bound to the Ethernet session of the terminal, determine, based on the quantity of terminal MAC addresses that can be bound to the Ethernet session of the terminal, that a new Ethernet session needs to be established for the terminal, and then initiate establishment of a new Ethernet session for the terminal. Based on the solution, a current problem that a single Ethernet session of the terminal supports a limited quantity of terminal MAC addresses but a terminal MAC address supported by the terminal is not definite can be resolved.

These aspects or other aspects in this application are clearer and more intelligible in descriptions of the following embodiments.

BRIEF DESCRIPTION OF DRAWINGS

To describe technical solutions in the embodiments of this application more clearly, the following briefly describes the accompanying drawings required for describing the embodiments.

DESCRIPTION OF EMBODIMENTS

The following describes the technical solutions in the embodiments of this application with reference to the accompanying drawings in the embodiments of this application. In description of this application, "/" means "or" unless otherwise specified. For example, A/B may indicate A or B. In this specification, "and/or" describes only an association relationship for describing associated objects and indicates that three relationships may exist. For example, A and/or B may indicate the following three cases: Only A exists, both A and B exist, and only B exists. In addition, in the descriptions of this application, "a plurality of" means two or more than two unless otherwise specified. In addition, to clearly describe the technical solutions in the embodiments of this application, the terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of a new service scenario, the technical solutions provided in the embodiments of this application are also applicable to a similar technical problem.

Figure 1:
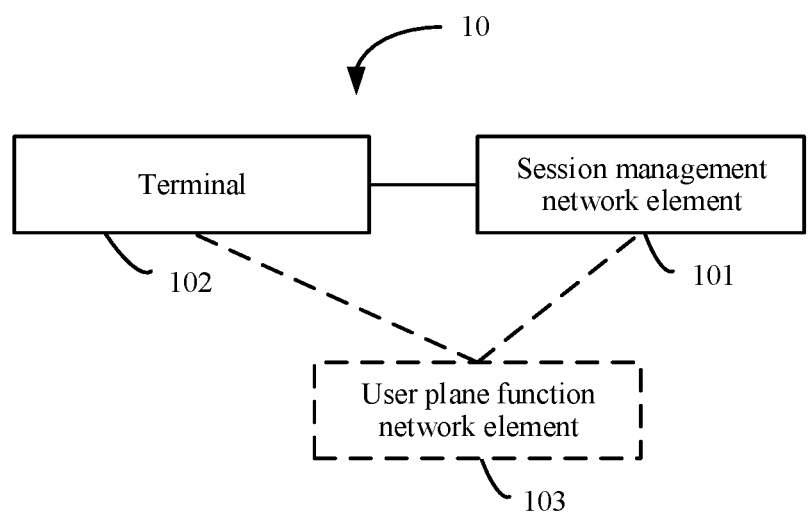
FIG. 1 is a schematic architectural diagram of a session management system according to an embodiment of this application.

FIG. 1 shows a session management system 10 according to an embodiment of this application. The session management system 10 includes a session management network element 101 and a terminal 102.

The session management network element 101 is configured to: obtain terminal MAC address information related to an Ethernet session of the terminal 102, and send the terminal MAC address information related to the Ethernet session of the terminal 102 to the terminal 102.

The terminal 102 is configured to: receive the terminal MAC address information related to the Ethernet session of the terminal 102 from the session management network element 101, determine, based on the terminal MAC address information related to the Ethernet session of the terminal 102, that a new Ethernet session needs to be established for the terminal 102, and then initiate establishment of a new Ethernet session for the terminal 102.

Optionally, the terminal MAC address information related to the Ethernet session of the terminal 102 may be indication information indicating that a terminal MAC address list that has been bound to an existing Ethernet session of the terminal 102 is full. In this case, as shown in FIG. 1, the session management system 10 provided in this embodiment of this application may further include a user plane function network element 103.

The user plane function network element 103 is configured to: determine that the terminal MAC address list that has been bound to the existing Ethernet session of the terminal 102 is full, and then send, to the session management network element 102, the indication information indicating that the terminal MAC address list that has been bound to the existing Ethernet session of the terminal 102 is full.

That the session management network element 101 is configured to obtain terminal MAC address information related to an Ethernet session of the terminal 102 includes: The session management network element 101 is configured to receive, from the user plane function network element 103, the indication information indicating that the terminal MAC address list that has been bound to the existing Ethernet session of the terminal 102 is full.

Optionally, in this embodiment of this application, the session management network element 101 and the terminal 102 need to communicate with each other through forwarding by an access device. This is not specifically limited in this embodiment of this application.

Optionally, in this embodiment of this application, the session management network element 101 and the user plane function network element 103 may directly communicate with each other, or may communicate with each other through forwarding by another network element or entity. This is not specifically limited in this embodiment of this application.

Optionally, in this embodiment of this application, the user plane function network element 103 and the terminal 102 may also communicate with each other, for example, communicate with each other through forwarding by the access device. This is not specifically limited in this embodiment of this application.

Optionally, in this embodiment of this application, that the session management network element communicates with one terminal is merely used as an example for description. Certainly, the session management network element may communicate with a plurality of terminals. In this case, each terminal may be considered as the terminal 102. This is not specifically limited in this embodiment of this application.

According to the session management system provided in this embodiment of this application, in the session management system, the terminal may obtain the terminal MAC address information related to the existing Ethernet session, determine, based on the terminal MAC address information related to the existing Ethernet session, that a new Ethernet session needs to be established for the terminal, and then initiate establishment of a new Ethernet session for the terminal. Therefore, a current problem that a single Ethernet session of the terminal supports a limited quantity of terminal MAC addresses but a terminal MAC address supported by the terminal is not definite can be resolved.

Figure 2:
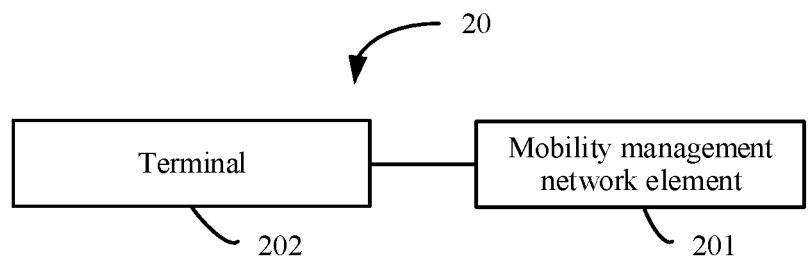
FIG. 2 is a schematic architectural diagram of a session management system according to an embodiment of this application.

Optionally, FIG. 2 shows another session management system 20 according to an embodiment of this application. The session management system 20 includes a mobility management network element 201 and a terminal 202.

The mobility management network element 201 is configured to: receive a registration request from the terminal 202, obtain a quantity of terminal MAC addresses that can be bound to an Ethernet session of the terminal 202, and then send a registration response to the terminal 202. The registration response carries the quantity of terminal MAC addresses that can be bound to the Ethernet session of the terminal 202.

The terminal 202 is configured to: receive the registration response from the mobility management network element 201, determine, based on the quantity, carried in the registration response, of terminal MAC addresses that can be bound to the Ethernet session of the terminal 202, that a new Ethernet session needs to be established for the terminal 202, and then initiate establishment of a new Ethernet session for the terminal 202.

Optionally, in this embodiment of this application, the mobility management network element 201 and the terminal 202 need to communicate with each other through forwarding by an access device. This is not specifically limited in this embodiment of this application.

Optionally, in this embodiment of this application, that the mobility management network element communicates with one terminal is merely used as an example for description. Certainly, the mobility management network element may communicate with a plurality of terminals. In this case, each terminal may be considered as the terminal 202. This is not specifically limited in this embodiment of this application.

According to the session management system provided in this embodiment of this application, in the session management system, the terminal may obtain the quantity of terminal MAC addresses that can be bound to the Ethernet session of the terminal, determine, based on the quantity of terminal MAC addresses that can be bound to the Ethernet session of the terminal, that a new Ethernet session needs to be established for the terminal, and then initiate establishment of a new Ethernet session for the terminal. Therefore, a current problem that a single Ethernet session of the terminal supports a limited quantity of terminal MAC addresses but a terminal MAC address supported by the terminal is not definite can be resolved.

Optionally, the session management system shown in FIG. 1 or the session management system shown in FIG. 2 may be applied to a current 5G network and another future network. This is not specifically limited in this embodiment.

Figure 3:
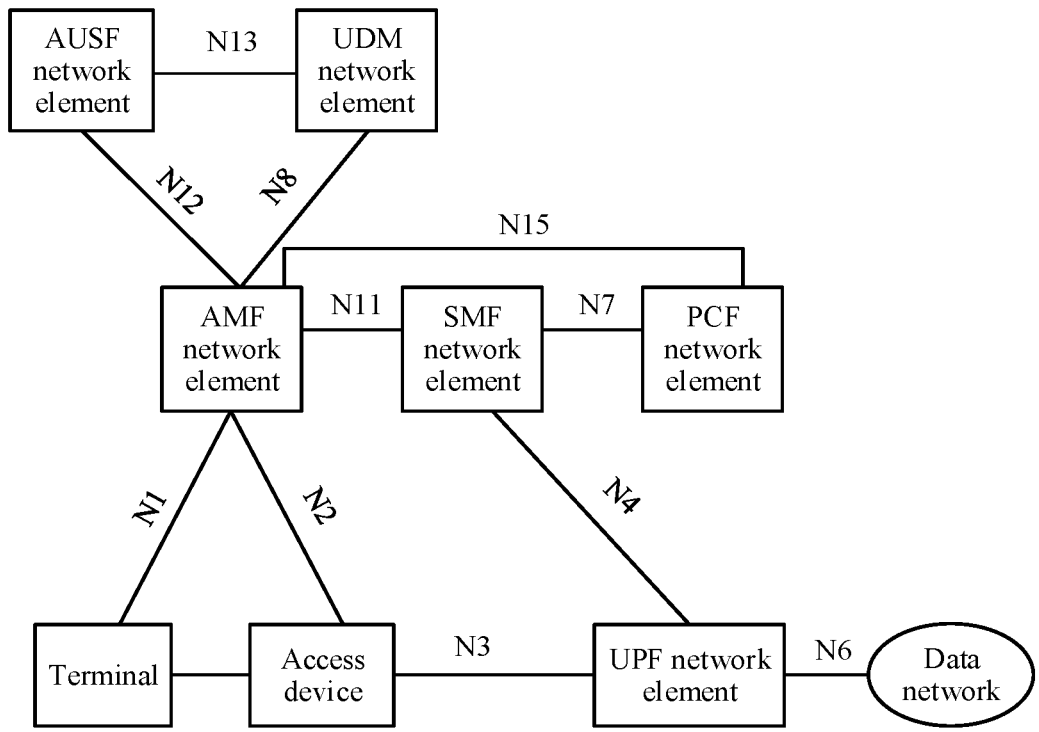
FIG. 3 is a schematic architectural diagram of a 5G network according to an embodiment of this application.

For example, the session management system shown in FIG. 1 or the session management system shown in FIG. 2 may be applied to the current 5G network. As shown in FIG. 3, a network element or an entity corresponding to the session management network element 101 may be an SMF network element in the 5G network. A network element or an entity corresponding to the terminal 102 or the terminal 202 may be a terminal in the 5G network. A network element or an entity corresponding to the mobility management network element 201 may be an access and mobility management function (AMF) network element in the 5G network. A network element or an entity corresponding to the user plane function network element 103 may be a UPF network element in the 5G network.

In addition, as shown in FIG. 3, the 5G network may further include an access device, a unified data management (UDM) network element, a policy control function (PCF) network element, an authentication server function (AUSF) network element, and some network elements that are not shown, for example, a DN-AAA server. This is not specifically limited in this embodiment of this application.

As shown in FIG. 3, in this embodiment of this application, the terminal accesses a 5G core network via the access device. The terminal communicates with the AMF network element through a next generation (N) 1 interface (N1 for short). The access device communicates with the AMF network element through an N2 interface (N2 for short). The access device communicates with the UPF network element through an N3 interface (N3 for short). The AMF network element communicates with the SMF network element through an N11 interface (N11 for short). The AMF network element communicates with the UDM network element through an N8 interface (N8 for short). The AMF network element communicates with the AUSF network element through an N12 interface (N12 for short). The AMF network element communicates with the PCF network element through an N15 interface (N15 for short). The SMF network element communicates with the PCF network element through an N7 interface (N7 for short). The SMF network element communicates with the UPF network element through an N4 interface (N4 for short). The UPF network element accesses a data network through an N6 interface (N6 for short).

It should be noted that, names of the interfaces between the network elements in FIG. 3 are merely examples and the interfaces may have other names in specific implementation. This is not specifically limited in this embodiment of this application.

It should be noted that the terminal, the access device, the AMF network element, the SMF network element, the UPF network element, the AUSF network element, the UDM network element, the PCF network element, or the like in FIG. 3 is merely a name, and the name constitutes no limitation on the device. In the 5G network and another future network, a network element or an entity corresponding to the terminal, the access device, the AMF network element, the SMF network element, the UPF network element, the AUSF network element, the UDM network element, or the PCF network element may have another name. This is not specifically limited in this embodiment of this application. For example, the UPF network element may alternatively be replaced by a UPF or a UPF entity. The UDM network element may alternatively be replaced by a home subscriber server (HSS), a user subscription database (USD), a database entity, or the like. A general description is provided herein, and details are not described below again.

Optionally, the terminal (terminal) in this embodiment of this application may include various handheld devices, vehicle-mounted devices, wearable devices, and computing devices that have a wireless communication function, or other processing devices connected to a wireless modem. The terminal may further include a subscriber unit (subscriber unit), a cellular phone (cellular phone), a smartphone (smart phone), a wireless data card, a personal digital assistant (personal digital assistant, PDA) computer, a tablet computer, a wireless modem (modem), a handheld (handheld) device, a laptop computer (laptop computer), a cordless phone (cordless phone) or a wireless local loop (WLL) station, a machine type communication (MTC) terminal, user equipment (UE), a mobile station (MS), a terminal device (terminal device), relay user equipment, or the like. The relay user equipment may be, for example, a 5G residential gateway (RG). For ease of description, in this application, the devices mentioned above are collectively referred to as a terminal.

Optionally, the access device in the embodiments of this application is a device that accesses the core network. For example, the access device may be a base station, a broadband network gateway (BNG), an aggregation switch, or a non-3rd generation partnership project (3rd generation partnership project, 3GPP) access network element. The base station may include base stations in various forms, for example, a macro base station, a micro base station (also referred to as a small cell), a relay station, and an access point.

Optionally, the session management network element, the terminal, or the user plane function network element in FIG. 1, or the mobility management network element or the terminal in FIG. 2 in the embodiments of this application may be implemented by one device, or may be implemented jointly by a plurality of devices, or may be a function module in one device. This is not specifically limited in the embodiments of this application. It may be understood that, the foregoing functions may be network elements in a hardware device, or may be software functions running on dedicated hardware, or may be virtualized functions instantiated on a platform (for example, a cloud platform).

Figure 4:
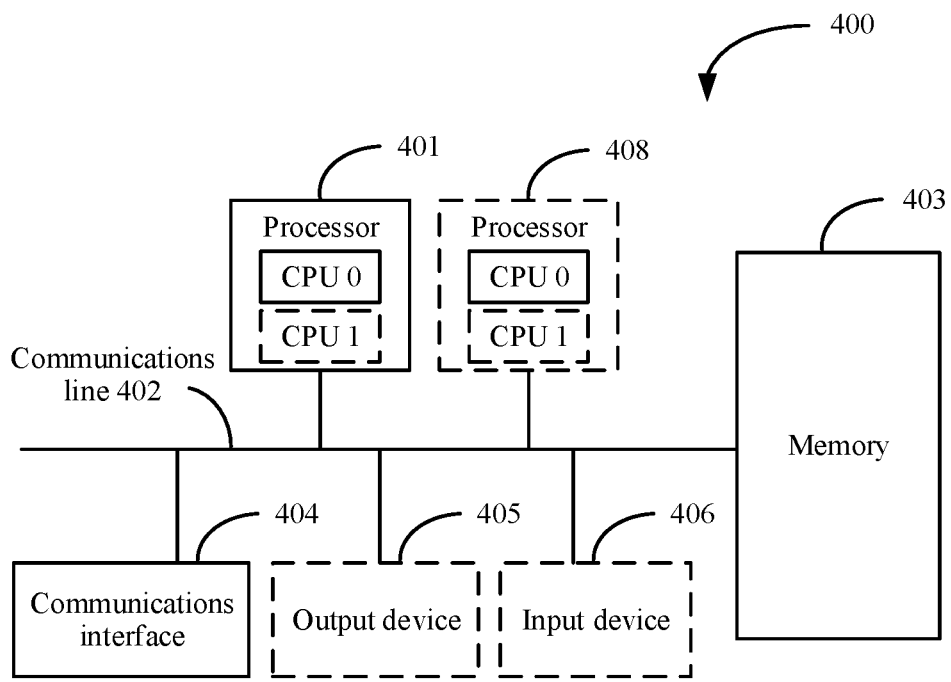
FIG. 4 is a schematic diagram of a hardware structure of a communications device according to an embodiment of this application.

For example, the session management network element, the terminal, or the user plane function network element in FIG. 1, or the mobility management network element or the terminal in FIG. 2 in the embodiments of this application may be implemented by using a communications device in FIG. 4. FIG. 4 is a schematic diagram of a hardware structure of a communications device according to an embodiment of this application. The communications device 400 includes at least one processor 401, a communications line 402, a memory 403, and at least one communications interface 404.

The processor 401 may be a general-purpose central processing unit (CPU), a microprocessor, an application-specific integrated circuit (ASIC), or one or more integrated circuits configured to control program execution of the solutions of this application.

The communications line 402 may include a path, to transfer information between the foregoing components.

The communications interface 404, which uses any apparatus such as a transceiver, is configured to communicate with another device or a communications network, for example, the Ethernet, a radio access network (RAN), or a wireless local area network (WLAN).

The memory 403 may be a read-only memory (ROM) or another type of static storage device that can store static information and an instruction, or a random access memory (RAM) or another type of dynamic storage device that can store information and an instruction. The memory may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 403 is not limited thereto. The memory may exist independently, and is connected to the processor by using the communication line 402. Alternatively, the memory may alternatively be integrated with the processor.

The memory 403 is configured to store a computer-executable instruction for executing the solutions of this application, and the processor 401 controls the execution. The processor 401 is configured to execute the computer-executable instruction stored in the memory 403, to implement a session management method provided in the following embodiments of this application.

Optionally, the computer-executable instruction in this embodiment of this application may also be referred to as application program code. This is not specifically limited in this embodiment of this application.

During implementation, in an embodiment, the processor 401 may include one or more CPUs, for example, a CPU 0 and a CPU 1 in FIG. 4.

During implementation, in an embodiment, the communications device 400 may include a plurality of processors, for example, the processor 401 and a processor 408 in FIG. 4. Each of the processors may be a single-core (single-CPU) processor, or may be a multi-core (multi-CPU) processor. The processor herein may be one or more devices, circuits, and/or processing cores for processing data (for example, computer program instructions).

During implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector (projector), or the like. The input device 406 communicates with the processor 401, and may receive an input of a user in a plurality of manners. For example, the input device 406 may be a mouse, a keyboard, a touchscreen device, a sensor device, or the like.

The communications device 400 may be a general-purpose device or a dedicated device. During implementation, the communications device 400 may be a desktop computer, a portable computer, a network server, a palmtop computer (PDA), a mobile phone, a tablet computer, a wireless terminal device, an embedded device, or a device with a structure similar to the structure in FIG. 4. A type of the communications device 400 is not limited in this embodiment of this application.

The following describes in detail the session management method provided in the embodiments of this application with reference to FIG. 1 to FIG. 4.

It should be noted that, in the following embodiments of this application, names of messages between network elements, names of parameters in the messages, or the like are merely examples. There may be other names during implementation. This is not specifically limited in the embodiments of this application.

Figure 5:
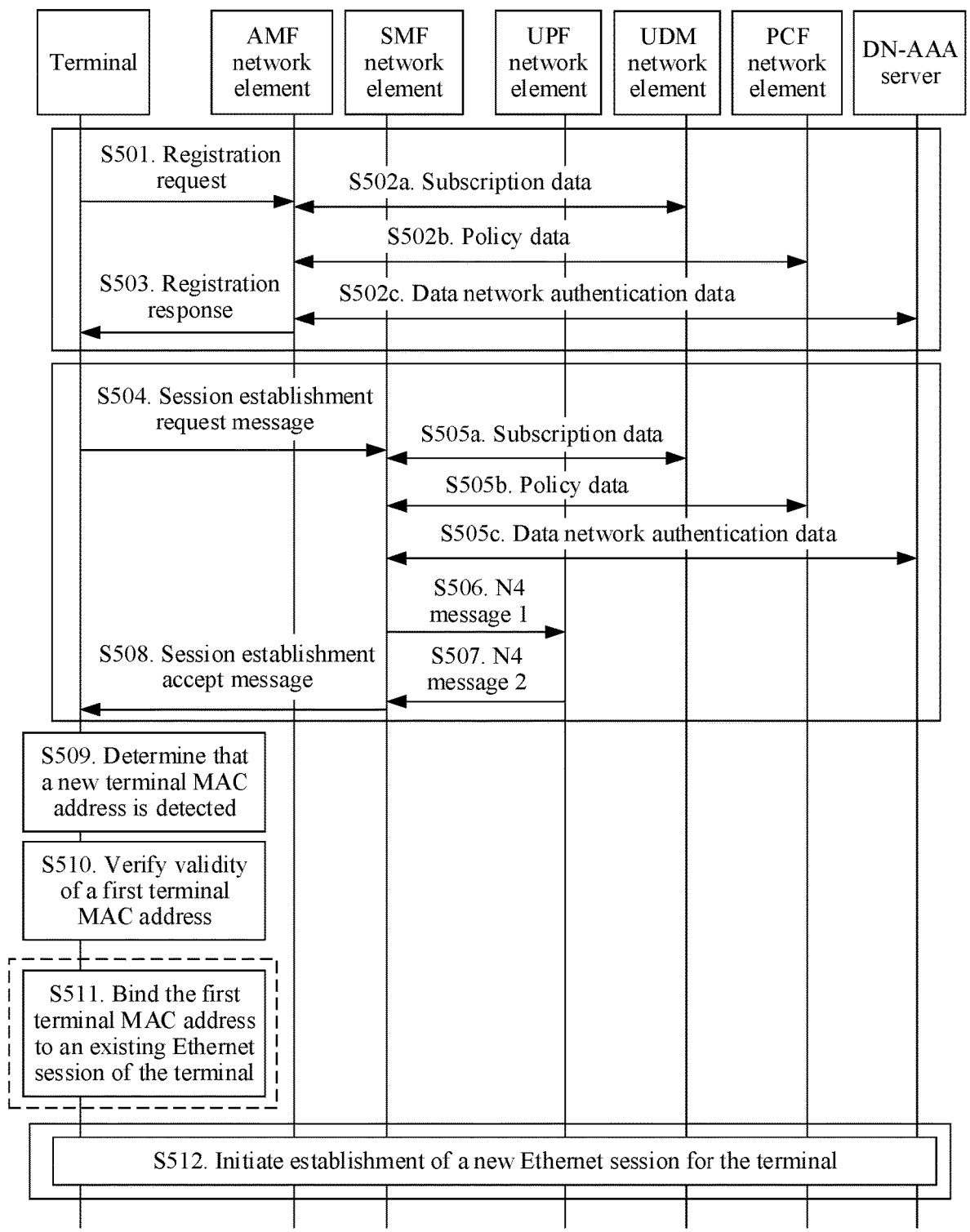
FIG. 5 is a schematic flowchart of a session management method according to an embodiment of this application.

For example, the session management system shown in FIG. 1 or the session management system shown in FIG. 2 is applied to the 5G network shown in FIG. 3. FIG. 5 shows a session management method according to an embodiment of this application, and the session management method includes the following steps.

S501. A terminal sends a registration request to an AMF network element, and the AMF network element receives the registration request from the terminal.

Further, the AMF network element may obtain, by performing the following steps S502a to S502c, at least one of a quantity of terminal MAC addresses that can be bound to an Ethernet session of the terminal and a terminal MAC address list supported by the terminal.

S502a. The AMF network element obtains subscription data of the terminal from a UDM network element.

S502b. The AMF network element obtains policy data of the terminal from a PCF network element.

S502c. The AMF network element obtains data network authentication data of the terminal from a DN-AAA server.

At least one of the subscription data of the terminal in step S502a, the policy data of the terminal in step S502b, or the data network authentication data of the terminal in step S502c includes at least one of the quantity of terminal MAC addresses that can be bound to the Ethernet session of the terminal and the terminal MAC address list supported by the terminal. In this embodiment, a terminal MAC address supported by the terminal is used for the Ethernet session. A general description is provided herein, and details are not described below again.

For example, the subscription data of the terminal includes the quantity of terminal MAC addresses that can be bound to the Ethernet session of the terminal and the terminal MAC address list supported by the terminal. Alternatively, the policy data of the terminal includes the quantity of terminal MAC addresses that can be bound to the Ethernet session of the terminal and the terminal MAC address list supported by the terminal. Alternatively, the data network authentication data of the terminal includes the quantity of terminal MAC addresses that can be bound to the Ethernet session of the terminal and the terminal MAC address list supported by the terminal. Alternatively, the subscription data of the terminal includes the quantity of terminal MAC addresses that can be bound to the Ethernet session of the terminal, and the policy data of the terminal includes the terminal MAC address list supported by the terminal. Alternatively, the subscription data of the terminal includes the quantity of terminal MAC addresses that can be bound to the Ethernet session of the terminal, and the data network authentication data of the terminal includes the terminal MAC address list supported by the terminal. Alternatively, the subscription data of the terminal includes the terminal MAC address list supported by the terminal, and the policy data of the terminal includes the quantity of terminal MAC addresses that can be bound to the Ethernet session of the terminal. Alternatively, the subscription data of the terminal includes the terminal MAC address list supported by the terminal, and the data network authentication data of the terminal includes the quantity of terminal MAC addresses that can be bound to the Ethernet session of the terminal. Alternatively, the policy data of the terminal includes the quantity of terminal MAC addresses that can be bound to the Ethernet session of the terminal, and the data network authentication data of the terminal includes the terminal MAC address list supported by the terminal. Alternatively, the policy data of the terminal includes the terminal MAC address list supported by the terminal, and the data network authentication data of the terminal includes the quantity of terminal MAC addresses that can be bound to the Ethernet session of the terminal. Alternatively, the subscription data of the terminal includes the quantity of terminal MAC addresses that can be bound to the Ethernet session of the terminal. Alternatively, the subscription data of the terminal includes the terminal MAC address list supported by the terminal. Alternatively, the policy data of the terminal includes the quantity of terminal MAC addresses that can be bound to the Ethernet session of the terminal. Alternatively, the policy data of the terminal includes the terminal MAC address list supported by the terminal. Alternatively, the data network authentication data of the terminal includes the quantity of terminal MAC addresses that can be bound to the Ethernet session of the terminal. Alternatively, the data network authentication data of the terminal includes the terminal MAC address list supported by the terminal, and so on. This is not specifically limited in this embodiment.

Further, the session management method provided in this embodiment further includes the following steps.

S503. The AMF network element sends a registration response to the terminal, and the terminal receives the registration response from the AMF network element. The registration response carries at least one of the obtained quantity of terminal MAC addresses that can be bound to the Ethernet session of the terminal and the terminal MAC address list supported by the terminal.

Optionally, at least one of the quantity of terminal MAC addresses that can be bound to the Ethernet session of the terminal or the terminal MAC address list supported by the terminal may alternatively be configured in the terminal. For example, the terminal MAC address list supported by the terminal may be configured in the terminal, and the registration response may not carry the terminal MAC address list supported by the terminal. Alternatively, the quantity of terminal MAC addresses that can be bound to the Ethernet session of the terminal may be configured in the terminal, and the registration response may not carry the quantity of terminal MAC addresses that can be bound to the Ethernet session of the terminal.

It should be noted that, in this embodiment, if the terminal MAC address list supported by the terminal is not configured in the terminal, the terminal MAC address list supported by the terminal needs to be carried in the registration response. In other words, the AMF network element needs to obtain the terminal MAC address list supported by the terminal, and then add the terminal MAC address list supported by the terminal to the registration response and send the registration response to the terminal. In other words, in this embodiment, the terminal needs to obtain the terminal MAC address list supported by the terminal.

Optionally, if the quantity of terminal MAC addresses that can be bound to the Ethernet session of the terminal is not configured in the terminal, the quantity of terminal MAC addresses that can be bound to the Ethernet session of the terminal may be further obtained by performing the following steps S504 to S508.

S504. The terminal sends a session establishment request message to an SMF network element, and the SMF network element receives the session establishment request message from the terminal.

Further, the SMF network element may obtain, by performing the following steps S505a to S505c, the quantity of terminal MAC addresses that can be bound to the Ethernet session.

S505a. The SMF network element obtains the subscription data of the terminal from the UDM network element.

S505b. The SMF network element obtains the policy data of the terminal from the PCF network element.

S505c. The SMF network element obtains the data network authentication data of the terminal from the DN-AAA server.

At least one of the subscription data of the terminal in step S505a, the policy data of the terminal in step S505b, or the data network authentication data of the terminal in step S505c includes the quantity of terminal MAC addresses that can be bound to the Ethernet session of the terminal.

Optionally, in this embodiment, the data network authentication data of the terminal may further include a terminal MAC address list available for the Ethernet session. This is not specifically limited in this embodiment.

S506. The SMF network element sends an N4 message 1 to the UPF network element, and the UPF network element receives the N4 message 1 from the SMF network element. The N4 message 1 carries a filtering rule, and the filtering rule includes the terminal MAC address list available for the Ethernet session.

S507. The UPF network element sends an N4 message 2 to the SMF network element, and the SMF network element receives the N4 message 2 from the UPF network element.

For an implementation of step S506 and step S507, refer to an existing implementation. Details are not described herein.

S508. The SMF network element sends a session establishment accept message to the terminal, and the terminal receives the session establishment accept message from the SMF network element. The session establishment accept message carries the quantity of terminal MAC addresses that can be bound to the Ethernet session.

It should be noted that, the foregoing steps S504 to S508 provide an Ethernet session establishment procedure. Certainly, another procedure may be further included during establishment of an Ethernet session. For details, refer to an existing Ethernet session establishment procedure. Details are not described herein.

In conclusion, in this embodiment, the quantity of terminal MAC addresses that can be bound to the Ethernet session of the terminal may be obtained through a registration procedure in steps S501 to S503, or may be obtained through the Ethernet session establishment procedure in steps S504 to S508. Alternatively, the quantity of terminal MAC addresses that can be bound to the Ethernet session of the terminal may be configured in the terminal. This is not specifically limited in this embodiment. The quantity, obtained through the Ethernet session establishment procedure in steps S504 to S508, of terminal MAC addresses that can be bound to the Ethernet session of the terminal is the quantity of terminal MAC addresses that can be bound to the Ethernet session. The quantity, obtained through the registration procedure in steps S501 to S503, of terminal MAC addresses that can be bound to the Ethernet session of the terminal and the quantity, configured in the terminal, of terminal MAC addresses that can be bound to the Ethernet session of the terminal may be applicable to all Ethernet sessions of the terminal. A general description is provided herein, and details are not described below again.

Until now, the terminal may obtain, in the foregoing manners, the quantity of terminal MAC addresses that can be bound to the Ethernet session of the terminal and the terminal MAC address list supported by the terminal. Further, the session management method provided in this embodiment further includes the following steps.

S509. The terminal determines that a new terminal MAC address is detected. It is assumed herein that the new MAC address is a first terminal MAC address.

Optionally, in this embodiment, the terminal may determine, in the following several scenarios, that a new terminal MAC address is detected:

For example, the terminal is a relay (relay) terminal. When a new remote (remote) terminal accesses the relay terminal, the relay terminal may determine that a new terminal MAC address is detected.

Alternatively, the terminal receives an uplink data packet, but there is no quality of service (QoS) rule matching a terminal MAC address in the uplink data packet received by the terminal. In this case, the terminal may determine that a new terminal MAC address is detected.

Alternatively, the terminal receives an uplink data packet. There is a QoS rule, with no Ethernet packet filter (QoS rule with no Ethernet Packet filter), matching a terminal MAC address in the uplink data packet received by the terminal. In this case, the terminal may determine that a new terminal MAC address is detected.

Alternatively, the terminal receives a downlink data packet, but a terminal MAC address in the downlink data packet is not in a terminal MAC address list that has been bound to an existing Ethernet session of the terminal, and so on.

Certainly, the foregoing several possible cases in which the terminal determines that a new terminal MAC address is detected are merely provided as an example. The terminal may alternatively determine, in another manner, that a new terminal MAC address is detected. This is not specifically limited in this embodiment.

S510. The terminal verifies validity of the first terminal MAC address.

Optionally, in this embodiment, if the first terminal MAC address is in the terminal MAC address list supported by the terminal, the terminal determines that the first terminal MAC address is valid, and further performs a subsequent step. If the first terminal MAC address is not in the terminal MAC address list supported by the terminal, the terminal determines that the first terminal MAC address is invalid, and directly discards the first terminal MAC address. In this case, a subsequent operation is not performed. A general description is provided herein, and details are not described below again.

S511. When determining that a quantity of terminal MAC addresses in the terminal MAC address list that has been bound to the existing Ethernet session of the terminal is different from the quantity of terminal MAC addresses that can be bound to the existing Ethernet session of the terminal, the terminal binds the first MAC address to the existing Ethernet session of the terminal, that is, stores the first terminal MAC address into the terminal MAC address list that has been bound to the existing Ethernet session of the terminal.

In this embodiment, the quantity of terminal MAC addresses that can be bound to the existing Ethernet session of the terminal may be the quantity, obtained through the registration procedure in steps S501 to S503, of terminal MAC addresses that can be bound to the Ethernet session of the terminal or the quantity, configured in the terminal, of terminal MAC addresses that can be bound to the Ethernet session of the terminal. Alternatively, the quantity of terminal MAC addresses that can be bound to the existing Ethernet session of the terminal may be the quantity, obtained through the Ethernet session establishment procedure in steps S504 to S508 in a process of establishing the existing Ethernet session, of terminal MAC addresses that can be bound to the existing Ethernet session. This is not specifically limited in this embodiment.

In this embodiment, that the quantity of terminal MAC addresses in the terminal MAC address list that has been bound to the existing Ethernet session of the terminal is different from the quantity of terminal MAC addresses that can be bound to the existing Ethernet session of the terminal means that the terminal MAC addresses that have been bound to the existing Ethernet session of the terminal are not full. In other words, the terminal determines that no new Ethernet session needs to be established for the terminal. A general description is provided herein, and details are not described below again.

For example, after the first terminal MAC address is stored in the terminal MAC address list that has been bound to the existing Ethernet session of the terminal, the terminal MAC address list that has been bound to the existing Ethernet session of the terminal may be shown in Table 1:

TABLE 1

| Ethernet session identifier | Terminal MAC address that has been bound |
| --- | --- |
| Ethernet session 1 | xxxxxxxx |
| Ethernet session 1 | xxxxxxxx |
| ... | ... |
| Ethernet session 2 | xxxxxxxx |
| Ethernet session 2 | First terminal MAC address |
| ... | ... |

Certainly, different Ethernet sessions of the terminal may correspond to different tables. For example, the session 1 and the Ethernet session 2 correspond to Table 2 and Table 3, respectively. This is not specifically limited in this embodiment.

TABLE 2

| Terminal MAC address that has been bound to the Ethernet session 1 |
| --- |
| xxxxxxxx |
| xxxxxxxx |
| ... |

TABLE 3

| Terminal MAC address that has been bound to the Ethernet session 2 |
| --- |
| xxxxxxxx |
| First terminal MAC address |
| ... |

Optionally, in this embodiment, when the terminal is to bind the first terminal MAC address to the existing Ethernet session of the terminal, there may be one or more existing Ethernet sessions, of the terminal, whose bound terminal MAC addresses are not full. When there is only one existing Ethernet session, of the terminal, whose bound terminal MAC addresses are not full, the first terminal MAC address may be directly bound to the existing Ethernet session, of the terminal, whose bound terminal MAC addresses are not full. When there are a plurality of existing Ethernet sessions, of the terminal, whose bound terminal MAC addresses are not full, the terminal may bind the first terminal MAC address to one of the plurality of existing Ethernet sessions, of the terminal, whose bound terminal MAC addresses are not full. A general description is provided herein, and this is not specifically limited in this embodiment.

S512. When determining that the quantity of terminal MAC addresses in the terminal MAC address list that has been bound to the existing Ethernet session of the terminal is equal to the quantity of terminal MAC addresses that can be bound to the existing Ethernet session of the terminal, the terminal initiates establishment of a new Ethernet session for the terminal. For the procedure of establishing a new Ethernet session, refer to the foregoing steps S504 to S508. Details are not described herein again.

In this embodiment, that the quantity of terminal MAC addresses in the terminal MAC address list that has been bound to the existing Ethernet session of the terminal is equal to the quantity of terminal MAC addresses that can be bound to the existing Ethernet session of the terminal means that the terminal MAC addresses that have been bound to the existing Ethernet session of the terminal are full. In other words, the terminal determines that a new Ethernet session needs to be established for the terminal. A general description is provided herein, and details are not described below again.

According to the session management method provided in this embodiment of this application, in the session management method, the terminal may obtain the quantity of terminal MAC addresses that can be bound to the Ethernet session of the terminal, determine, based on the quantity of terminal MAC addresses that can be bound to the Ethernet session of the terminal, that a new Ethernet session needs to be established for the terminal, and then initiate establishment of a new Ethernet session for the terminal. Therefore, a current problem that a single Ethernet session of the terminal supports a limited quantity of terminal MAC addresses but a terminal MAC address supported by the terminal is not definite can be resolved.

Actions of the terminal, the SMF network element, or the AMF network element in steps S501 to S512 may be performed by the processor 401 in the communications device 400 shown in FIG. 4 by invoking the application program code stored in the memory 403. This is not limited in this embodiment.

Figure 6A:
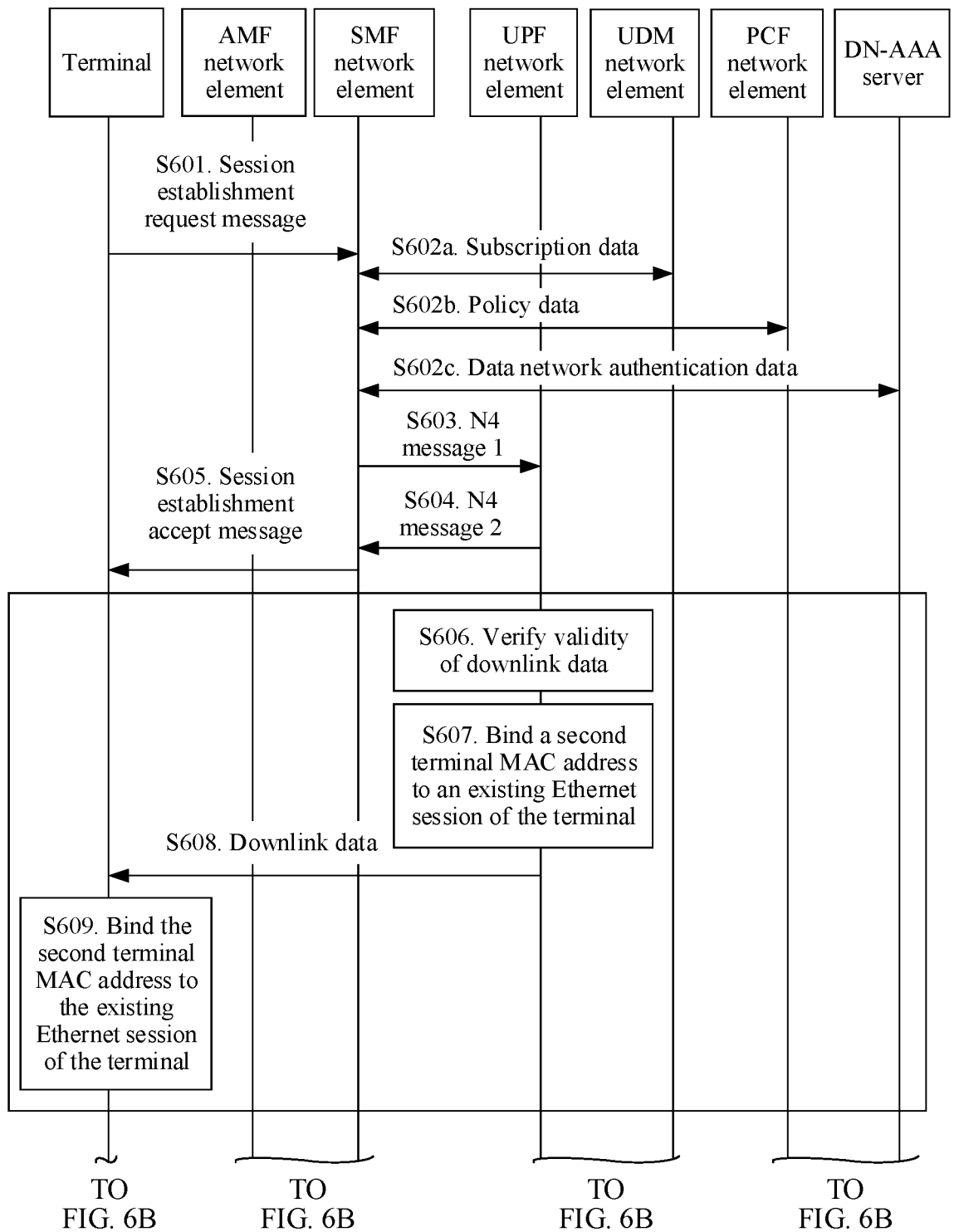
FIG. 6A and FIG. 6B are a schematic flowchart of a session management method according to an embodiment of this application.
Figure 6B:
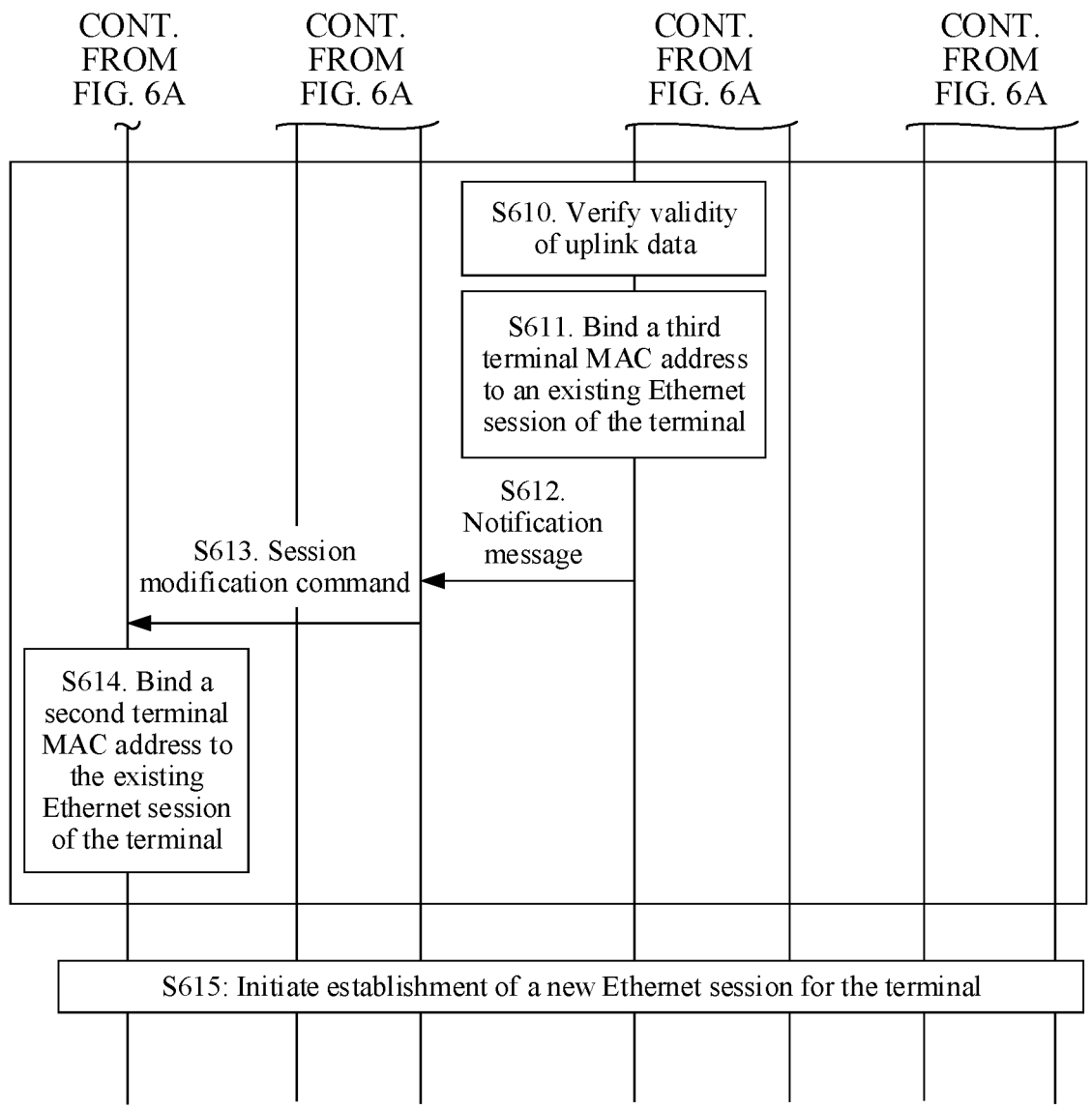

Optionally, for example, the session management system shown in FIG. 1 is applied to the 5G network shown in FIG. 3. FIG. 6A and FIG. 6B show a session management method according to an embodiment of this application. The session management method includes the following steps.

Steps S601 to S605. Same as steps S504 to S508. For related descriptions, refer to the embodiment shown in FIG. 5. Details are not described herein again.

Optionally, in this embodiment, a terminal may obtain, in a registration procedure, a quantity of terminal MAC addresses that can be bound to an Ethernet session of the terminal. Alternatively, the quantity of terminal MAC addresses that can be bound to the Ethernet session of the terminal is configured in the terminal. For details, reference may be made to the embodiment shown in FIG. 5. Details are not described herein in this embodiment.

Optionally, for terminal-related downlink data, the session management method provided in this embodiment further includes the following steps.

S606. A UPF network element verifies validity of the terminal-related downlink data according to a filtering rule.

Optionally, in this embodiment, if a second terminal MAC address carried in the downlink data is in a terminal MAC address list available for an existing Ethernet session of the terminal, the UPF network element determines that the downlink data is valid, and further performs a subsequent step. If the second terminal MAC address carried in the downlink data is not in the terminal MAC address list available for the existing Ethernet session of the terminal, the UPF network element determines that the downlink data is invalid, and directly discards the downlink data. In this case, a subsequent operation is not performed. A general description is provided herein, and details are not described below again.

S607. The UPF network element binds the second MAC address to the existing Ethernet session of the terminal, that is, stores the second terminal MAC address into a terminal MAC address list that has been bound to the existing Ethernet session of the terminal.

For related implementation of step S607, refer to step S511. Details are not described herein again.

S608. The UPF network element sends the downlink data to the terminal, and the terminal receives the downlink data from the UPF network element. The downlink data carries the second terminal MAC address.

In this embodiment, the downlink data may be transmitted by the UPF network element on a corresponding QoS flow (flow) based on a service data flow (SDF) template. This is not specifically limited in this embodiment.

S609. The terminal binds the second MAC address to the existing Ethernet session of the terminal, that is, stores the second terminal MAC address into the terminal MAC address list that has been bound to the existing Ethernet session of the terminal.

For related implementation of step S609, refer to step S511. Details are not described herein again.

Optionally, for terminal-related uplink data, the session management method provided in this embodiment further includes the following steps.

S610. The UPF network element verifies validity of the terminal-related uplink data according to the filtering rule.

Optionally, in this embodiment, if a third terminal MAC address carried in the uplink data is in the terminal MAC address list available for the existing Ethernet session of the terminal, the UPF network element determines that the uplink data is valid, and further performs a subsequent step. If the third terminal MAC address carried in the uplink data is not in the terminal MAC address list available for the existing Ethernet session of the terminal, the UPF network element determines that the uplink data is invalid, and directly discards the uplink data. In this case, a subsequent operation is not performed. A general description is provided herein, and details are not described below again.

S611. The UPF network element binds the third MAC address to the existing Ethernet session of the terminal, that is, stores the third terminal MAC address into the terminal MAC address list that has been bound to the existing Ethernet session of the terminal.

For related implementation of step S611, refer to step S511. Details are not described herein again.

S612. The UPF network element sends a notification message to an SMF network element, and the SMF network element receives the notification message from the UPF network element. The notification message carries the third MAC address that is newly bound to the existing Ethernet session of the terminal.

S613. The SMF network element sends a session modification command to the terminal, and the terminal receives the session modification command from the SMF network element. The session modification command carries the third MAC address.

S614. The terminal binds the third MAC address to the existing Ethernet session of the terminal, that is, stores the third terminal MAC address into the terminal MAC address list that has been bound to the existing Ethernet session of the terminal.

For related implementation of step S614, refer to step S511. Details are not described herein again.

Further, the session management method provided in this embodiment further includes the following steps.

S615. When determining that a quantity of terminal MAC addresses in the terminal MAC address list that has been bound to the existing Ethernet session of the terminal is equal to a quantity of terminal MAC addresses that can be bound to the existing Ethernet session of the terminal, the terminal initiates establishment of a new Ethernet session for the terminal. For a procedure of establishing a new Ethernet session, refer to the foregoing steps S601 to S605. Details are not described herein again.

In this embodiment, that the quantity of terminal MAC addresses in the terminal MAC address list that has been bound to the existing Ethernet session of the terminal is equal to the quantity of terminal MAC addresses that can be bound to the existing Ethernet session of the terminal means that the terminal MAC addresses that have been bound to the existing Ethernet session of the terminal are full. In other words, the terminal determines that a new Ethernet session needs to be established for the terminal. A general description is provided herein, and details are not described below again.

According to the session management method provided in this embodiment of this application, a current problem that a single Ethernet session of the terminal supports a limited quantity of terminal MAC addresses but a terminal MAC address supported by the terminal is not definite can be resolved. For related descriptions, refer to the embodiment shown in FIG. 5. Details are not described herein again.

Actions of the terminal or the SMF network element in steps S601 to S615 may be performed by the processor 401 in the communications device 400 shown in FIG. 4 by invoking the application program code stored in the memory 403. This is not limited in this embodiment.

Figure 7:
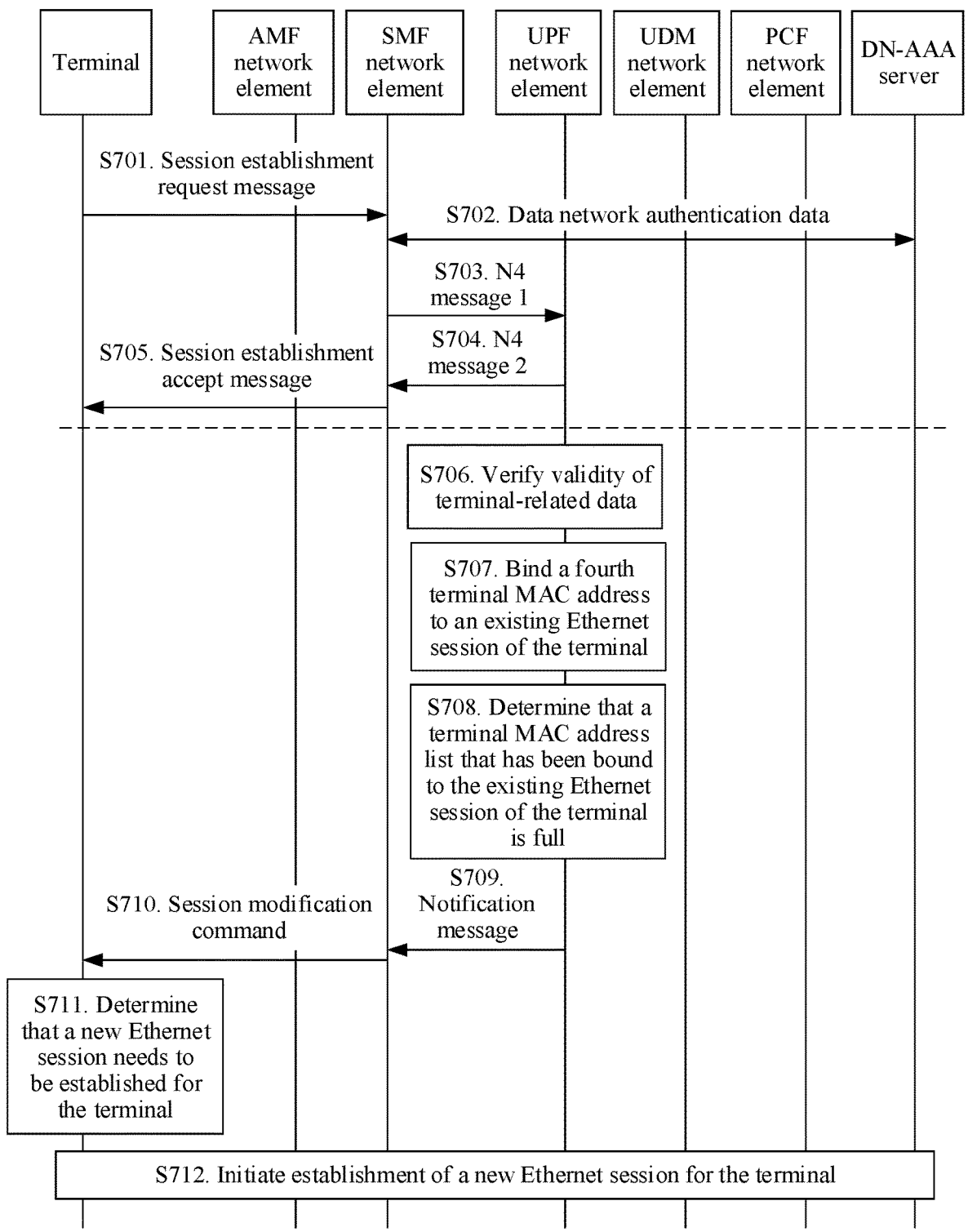
FIG. 7 is a schematic flowchart of a session management method according to an embodiment of this application.

Optionally, for example, the session management system shown in FIG. 1 is applied to the 5G network shown in FIG. 3. FIG. 7 shows a session management method according to an embodiment of this application. The session management method includes the following steps.

S701. Same as step S504. For related descriptions, refer to the embodiment shown in FIG. 5. Details are not described herein again.

S702. Same as step S505c. For related descriptions, refer to the embodiment shown in FIG. 5. Details are not described herein again.

S703 and S704. Same as steps S506 and S507. For related descriptions, refer to the embodiment shown in FIG. 5. Details are not described again herein.

S705. An SMF network element sends a session establishment accept message to a terminal, and the terminal receives the session establishment accept message from the SMF network element.

It should be noted that, the foregoing steps S701 to S705 provide an Ethernet session establishment procedure. Certainly, another procedure may be further included during establishment of an Ethernet session. For details, refer to an existing Ethernet session establishment procedure. Details are not described herein.

Further, the session management method provided in this embodiment may further include the following steps.

S706. A UPF network element verifies validity of terminal-related data according to a filtering rule.

Optionally, in this embodiment, the terminal-related data may be uplink data, or may be downlink data. This is not specifically limited in this embodiment.

Optionally, in this embodiment, if a fourth terminal MAC address carried in the terminal-related data is in a terminal MAC address list available for an existing Ethernet session of the terminal, the UPF network element determines that the terminal-related data is valid, and further performs a subsequent step. If the fourth terminal MAC address carried in the terminal-related data is not in the terminal MAC address list available for the existing Ethernet session of the terminal, the UPF network element determines that the terminal-related data is invalid, and directly discards the terminal-related data. In this case, a subsequent operation is not performed. A general description is provided herein, and details are not described below again.

S707. The UPF network element binds the fourth MAC address to the existing Ethernet session of the terminal, that is, stores the fourth terminal MAC address into the terminal MAC address list that has been bound to the existing Ethernet session of the terminal.

For related implementation of step S707, refer to step S511. Details are not described herein again.

S708. The UPF network element determines that the terminal MAC address list that has been bound to the existing Ethernet session of the terminal is full.

Optionally, in this embodiment, that the UPF network element determines that the terminal MAC address list that has been bound to the existing Ethernet session of the terminal is full may include: determining, by the UPF network element, that the terminal MAC address list that has been bound to the existing Ethernet session of the terminal is the same as the terminal MAC address list available for the existing Ethernet session of the terminal.

S709. The UPF network element sends a notification message to the SMF network element, and the SMF network element receives the notification message from the UPF network element. The notification message carries indication information indicating that the terminal MAC address list that has been bound to the existing Ethernet session of the terminal is full.

S710. The SMF network element sends a session modification command to the terminal, and the terminal receives the session modification command from the SMF network element. The session modification command carries the indication information indicating that the terminal MAC address list that has been bound to the existing Ethernet session of the terminal is full.

S711. The terminal determines, based on the indication information indicating that the terminal MAC address list that has been bound to the existing Ethernet session of the terminal is full, that a new Ethernet session needs to be established for the terminal.

S712. The terminal initiates establishment of a new Ethernet session for the terminal.

For the procedure of establishing a new Ethernet session, refer to the foregoing steps S701 to S705. Details are not described herein again.

According to the session management method provided in this embodiment of this application, in the session management method, the terminal may obtain the indication information indicating that the terminal MAC address list that has been bound to the existing Ethernet session of the terminal is full, determine, based on the indication information, that a new Ethernet session needs to be established for the terminal, and then initiate establishment of a new Ethernet session for the terminal. Therefore, a current problem that a single Ethernet session of the terminal supports a limited quantity of terminal MAC addresses but a terminal MAC address supported by the terminal is not definite can be resolved.

Actions of the terminal, the SMF network element, or the UPF network element in steps S701 to S712 may be performed by the processor 401 in the communications device 400 shown in FIG. 4 by invoking the application program code stored in the memory 403. This is not limited in this embodiment.

Figure 8:
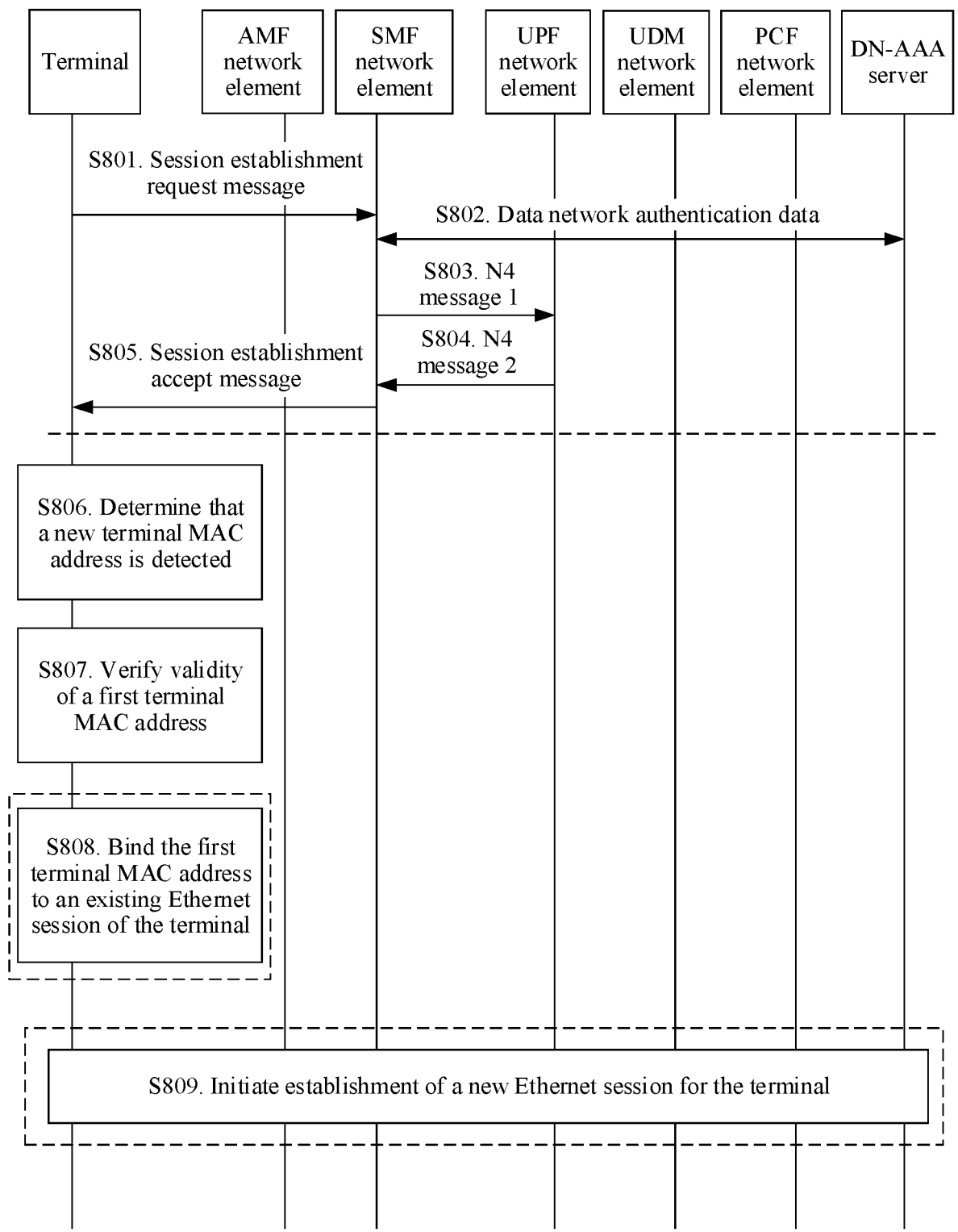
FIG. 8 is a schematic flowchart of a session management method according to an embodiment of this application.

Optionally, for example, the session management system shown in FIG. 1 is applied to the 5G network shown in FIG. 3. FIG. 8 shows a session management method according to an embodiment of this application. The session management method includes the following steps.

Steps S801 to S804. Same as steps S701 to S704. For related descriptions, refer to the embodiment shown in FIG. 7. Details are not described herein again.

S805. An SMF network element sends a session establishment accept message to a terminal, and the terminal receives the session establishment accept message from the SMF network element. The session establishment accept message carries a terminal MAC address list available for the Ethernet session.

It should be noted that, the foregoing steps S701 to S705 provide an Ethernet session establishment procedure. Certainly, another procedure may be further included during establishment of an Ethernet session. For details, refer to an existing Ethernet session establishment procedure. Details are not described herein.

S806. Same as step S509. For related descriptions, refer to the embodiment shown in FIG. 5. Details are not described herein again.

S807. The terminal verifies validity of a first terminal MAC address.

Optionally, in this embodiment, if the first terminal MAC address is in a terminal MAC address list available for an existing Ethernet session of the terminal, the terminal determines that the first terminal MAC address is valid, and further performs a subsequent step. If the first terminal MAC address is not in the terminal MAC address list available for the existing Ethernet session of the terminal, the terminal determines that the first terminal MAC address is invalid, and directly discards the first terminal MAC address. In this case, a subsequent operation is not performed. A general description is provided herein, and details are not described below again.

S808. When determining that the terminal MAC address list available for the existing Ethernet session of the terminal is different from a terminal MAC address list that has been bound to the existing Ethernet session of the terminal, the terminal binds the first MAC address to the existing Ethernet session of the terminal, that is, stores the first terminal MAC address into the terminal MAC address list that has been bound to the existing Ethernet session of the terminal.

In this embodiment, that the terminal MAC address list available for the existing Ethernet session of the terminal is different from the terminal MAC address list that has been bound to the existing Ethernet session of the terminal means that terminal MAC addresses that have been bound to the existing Ethernet session of the terminal are not full. In other words, the terminal determines that no new Ethernet session needs to be established for the terminal. A general description is provided herein, and details are not described below again.

For related descriptions of step S808, refer to step S511. Details are not described herein again.

S809. When determining that the terminal MAC address list available for the existing Ethernet session of the terminal is the same as the terminal MAC address list that has been bound to the existing Ethernet session of the terminal, the terminal initiates establishment of a new Ethernet session for the terminal. For a process of establishing a new Ethernet session, refer to the foregoing steps S801 to S805. Details are not described herein again.

In this embodiment, that the terminal MAC address list available for the existing Ethernet session of the terminal is the same as the terminal MAC address list that has been bound to the existing Ethernet session of the terminal means that the terminal MAC addresses that have been bound to the existing Ethernet session of the terminal are full. In other words, the terminal determines that a new Ethernet session needs to be established for the terminal. A general description is provided herein, and details are not described below again.

According to the session management method provided in this embodiment of this application, in the session management method, the terminal may obtain the terminal MAC address list available for the existing Ethernet session of the terminal, determine, based on the terminal MAC address list available for the existing Ethernet session of the terminal, that a new Ethernet session needs to be established for the terminal, and then initiate establishment of a new Ethernet session for the terminal. Therefore, a current problem that a single Ethernet session of the terminal supports a limited quantity of terminal MAC addresses but a terminal MAC address supported by the terminal is not definite can be resolved.

Actions of the terminal or the SMF network element in steps S801 to S809 may be performed by the processor 401 in the communications device 400 shown in FIG. 4 by invoking the application program code stored in the memory 403. This is not limited in this embodiment.

Figure 9:
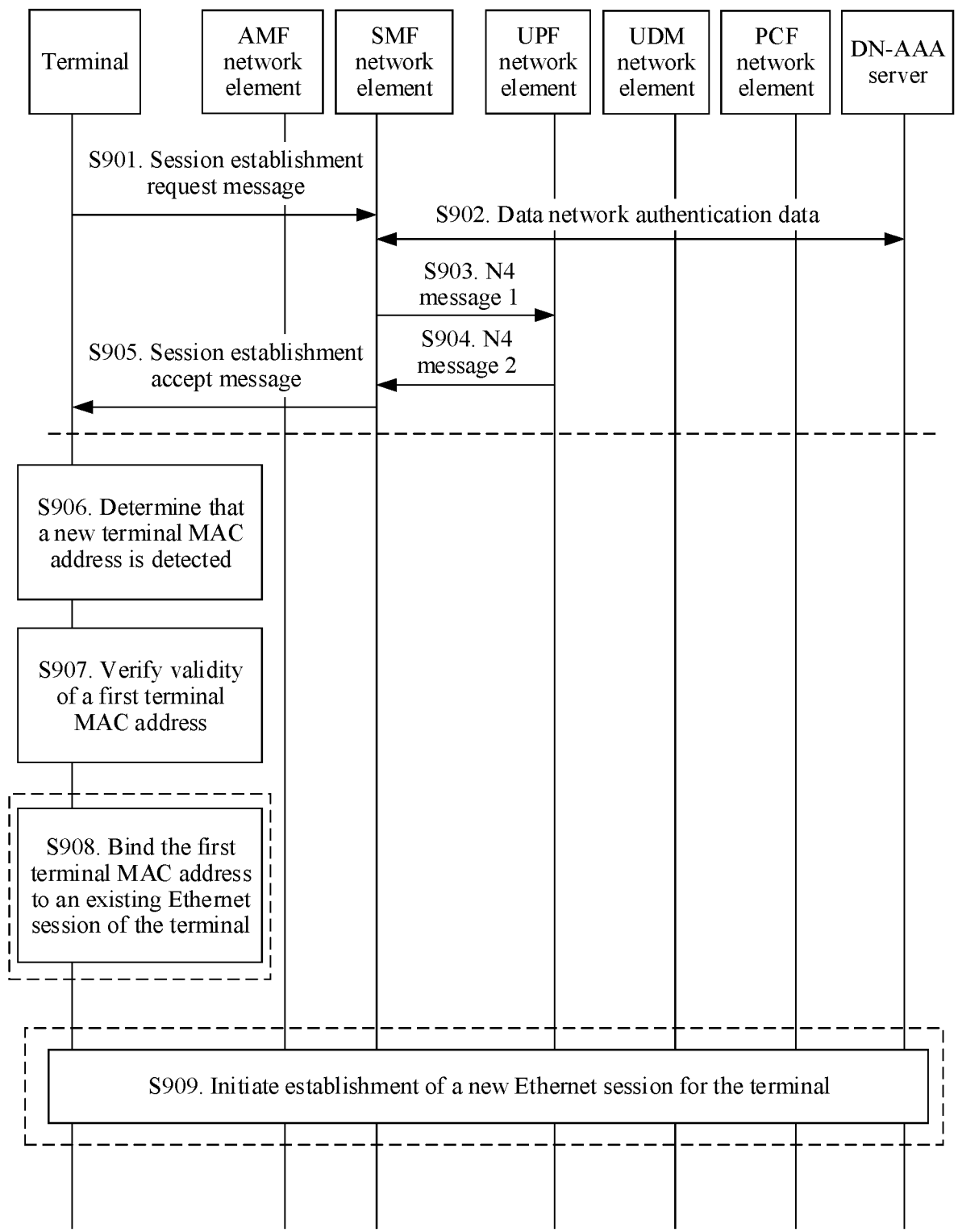
FIG. 9 is a schematic flowchart of a session management method according to an embodiment of this application.

Optionally, for example, the session management system shown in FIG. 1 is applied to the 5G network shown in FIG. 3. FIG. 9 shows a session management method according to an embodiment of this application. The session management method includes the following steps.

Steps S901 to S907. Same as steps S801 to S807. For related descriptions, refer to the embodiment shown in FIG. 8. Details are not described herein again.

S908. When determining that the first terminal MAC address is in a terminal MAC address list available for an existing Ethernet session of a terminal, the terminal binds the first MAC address to the existing Ethernet session of the terminal, that is, stores the first terminal MAC address into a terminal MAC address list that has been bound to the existing Ethernet session of the terminal.

In this embodiment, the terminal determines that the first terminal MAC address is in the terminal MAC address list available for the existing Ethernet session of the terminal. In other words, the terminal determines that no new Ethernet session needs to be established for the terminal. A general description is provided herein, and details are not described below again.

For related descriptions of step S908, refer to step S511. Details are not described herein again.

S909. When determining that the first terminal MAC address is not in the terminal MAC address list available for the existing Ethernet session of the terminal, the terminal initiates establishment of a new Ethernet session for the terminal. For a process of establishing a new Ethernet session, refer to the foregoing steps S901 to S905. Details are not described herein again.

In this embodiment, the terminal determines that the first terminal MAC address is not in the terminal MAC address list available for the existing Ethernet session of the terminal. In other words, the terminal determines that a new Ethernet session needs to be established for the terminal. A general description is provided herein, and details are not described below again.

According to the session management method provided in this embodiment of this application, a current problem that a single Ethernet session of the terminal supports a limited quantity of terminal MAC addresses but a terminal MAC address supported by the terminal is not definite can be resolved. For related descriptions, refer to the embodiment shown in FIG. 8. Details are not described herein again.

Actions of the terminal or an SMF network element in steps S901 to S909 may be performed by the processor 401 in the communications device 400 shown in FIG. 4 by invoking the application program code stored in the memory 403. This is not limited in this embodiment.

In conclusion, an embodiment of this application discloses a session management method, including: obtaining, by a terminal, terminal MAC address information related to an existing Ethernet session of the terminal; determining, by the terminal based on the terminal MAC address information related to the existing Ethernet session of the terminal, that a new Ethernet session needs to be established for the terminal; and initiating, by the terminal, establishment of a new Ethernet session for the terminal.

In an implementation, the terminal MAC address information related to the existing Ethernet session of the terminal includes: a terminal MAC address list that has been bound to the existing Ethernet session of the terminal and a quantity of terminal MAC addresses that can be bound to the existing Ethernet session of the terminal. The determining, by the terminal based on the terminal MAC address information related to the existing Ethernet session of the terminal, that a new Ethernet session needs to be established for the terminal includes: determining, by the terminal, that a quantity of terminal MAC addresses in the terminal MAC address list that has been bound to the existing Ethernet session of the terminal is equal to the quantity of terminal MAC addresses that can be bound to the existing Ethernet session of the terminal.

In an implementation, the obtaining, by a terminal, a quantity of terminal MAC addresses that can be bound to the existing Ethernet session of the terminal includes: obtaining, by the terminal, a preconfigured quantity of terminal MAC addresses that can be bound to the existing Ethernet session of the terminal. In other words, the terminal may preconfigure a quantity of terminal MAC addresses that can be bound to an Ethernet session of the terminal, and the quantity of terminal MAC addresses that can be bound to the Ethernet session of the terminal may be used as the quantity of terminal MAC addresses that can be bound to the existing Ethernet session of the terminal.

In another implementation, the obtaining, by a terminal, a quantity of terminal MAC addresses that can be bound to the existing Ethernet session of the terminal includes: receiving, by the terminal, a registration accept message from a mobility management network element, where the registration accept message carries the quantity of terminal MAC addresses that can be bound to the existing Ethernet session of the terminal. In other words, the terminal may obtain, by using a registration procedure, the quantity of terminal MAC addresses that can be bound to the Ethernet session of the terminal, and the quantity of terminal MAC addresses that can be bound to the Ethernet session of the terminal may be used as the quantity of terminal MAC addresses that can be bound to the existing Ethernet session of the terminal.

In another implementation, the obtaining, by a terminal, a quantity of terminal MAC addresses that can be bound to the existing Ethernet session of the terminal includes: receiving, by the terminal, a session establishment accept message from a session management network element, where the session establishment accept message carries the quantity of terminal MAC addresses that can be bound to the existing Ethernet session of the terminal. In other words, the terminal may obtain, by using a session establishment procedure, the quantity of terminal MAC addresses that can be bound to the Ethernet session.

Optionally, the session management method provided in this embodiment of this application may further include: obtaining, by the terminal, a terminal MAC address list supported by the terminal; and when the terminal detects a new terminal MAC address, the terminal determines that the new terminal MAC address is in the terminal MAC address list supported by the terminal.

In an implementation, the obtaining, by the terminal, a terminal MAC address list supported by the terminal includes: obtaining, by the terminal, a preconfigured terminal MAC address list supported by the terminal. In other words, the terminal may preconfigure the terminal MAC address list supported by the terminal.

In another implementation, the obtaining, by the terminal, a terminal MAC address list supported by the terminal includes: receiving, by the terminal, the registration accept message from the mobility management network element, where the registration accept message carries the terminal MAC address list supported by the terminal. In other words, the terminal may obtain, by using the registration procedure, the terminal MAC address list supported by the terminal.

Alternatively, optionally, the session management method provided in this embodiment of this application may further include: receiving, by the terminal, a terminal MAC address from a network side; and storing, by the terminal, the terminal MAC address from the network side into the terminal MAC address list that has been bound to the existing Ethernet session of the terminal.

In another implementation, the terminal MAC address information related to the existing Ethernet session of the terminal includes: a terminal MAC address list available for the existing Ethernet session of the terminal; and the determining, by the terminal based on the terminal MAC address information related to the existing Ethernet session of the terminal, that a new Ethernet session needs to be established for the terminal includes: when the terminal detects a new terminal MAC address, determining, by the terminal, that the new terminal MAC address is not in the terminal MAC address list available for the existing Ethernet session of the terminal.

In another implementation, the terminal MAC address information related to the existing Ethernet session of the terminal includes: the terminal MAC address list available for the existing Ethernet session of the terminal and the terminal MAC address list that has been bound to the existing Ethernet session of the terminal; and the determining, by the terminal based on the terminal MAC address information related to the existing Ethernet session of the terminal, that a new Ethernet session needs to be established for the terminal includes: determining, by the terminal, that the terminal MAC address list available for the existing Ethernet session of the terminal is the same as the terminal MAC address list that has been bound to the existing Ethernet session of the terminal.

In another implementation, the terminal MAC address information related to the existing Ethernet session of the terminal includes: indication information indicating that the terminal MAC address list that has been bound to the existing Ethernet session of the terminal is full.

Optionally, the obtaining, by a terminal, indication information indicating that the terminal MAC address list that has been bound to the existing Ethernet session of the terminal is full includes: receiving, by the terminal from the session management network element, the indication information indicating that the terminal MAC address list that has been bound to the existing Ethernet session of the terminal is full.

In the foregoing session management method, for example, for an operation of the terminal, refer to the operation of the terminal in FIG. 5 to FIG. 9 and the foregoing related text descriptions. Details are not described herein again.

In addition, an embodiment of this application further discloses a session management method, including: obtaining, by a session management network element, terminal MAC address information related to an Ethernet session of a terminal; and sending, by the session management network element, the terminal MAC address information related to the Ethernet session of the terminal to the terminal, where the terminal MAC address information related to the Ethernet session of the terminal is used by the terminal to determine whether a new Ethernet session needs to be established for the terminal.

In an implementation, the terminal MAC address information related to the Ethernet session of the terminal includes a terminal MAC address list available for the Ethernet session of the terminal, a quantity of terminal MAC addresses that can be bound to the Ethernet session of the terminal, or indication information indicating that a terminal MAC address list that has been bound to an existing Ethernet session of the terminal is full.

Optionally, the terminal MAC address information related to the Ethernet session of the terminal includes the quantity of terminal MAC addresses that can be bound to the Ethernet session of the terminal. The obtaining, by a session management network element, terminal MAC address information related to an Ethernet session of a terminal includes: obtaining, by the session management network element, a local policy, subscription data of the terminal, policy data of the terminal, or data network authentication data of the terminal, where the local policy, the subscription data of the terminal, the policy data of the terminal, or the data network authentication data of the terminal includes the quantity of terminal MAC addresses that can be bound to the Ethernet session of the terminal.

Alternatively, optionally, the terminal MAC address information related to the Ethernet session of the terminal includes the terminal MAC address list available for the Ethernet session of the terminal. The obtaining, by a session management network element, terminal MAC address information related to an Ethernet session of a terminal includes: obtaining, by the session management network element, the data network authentication data of the terminal, where the data network authentication data of the terminal includes the terminal MAC address list available for the Ethernet session of the terminal.

Alternatively, optionally, the terminal MAC address information related to the Ethernet session of the terminal includes the indication information indicating that the terminal MAC address list that has been bound to the existing Ethernet session of the terminal is full. The obtaining, by a session management network element, terminal MAC address information related to an Ethernet session of a terminal includes: receiving, by the session management network element from a user plane function network element, the indication information indicating that the terminal MAC address list that has been bound to the existing Ethernet session of the terminal is full.

In the foregoing session management method, for example, for an operation of the session management network element, refer to the operation of the SMF network element in FIG. 5 to FIG. 9 and the foregoing related text descriptions. Details are not described herein again.

In addition, an embodiment of this application further discloses a session management method, including: receiving, by a mobility management network element, a registration request from a terminal; obtaining, by the mobility management network element, at least one of a quantity of terminal MAC addresses that can be bound to an Ethernet session of the terminal or a terminal MAC address list supported by the terminal; and sending, by the mobility management network element, a registration response to the terminal, where the registration response carries at least one of the quantity of terminal MAC addresses that can be bound to the Ethernet session of the terminal or the terminal MAC address list supported by the terminal. The quantity of terminal MAC addresses that can be bound to the Ethernet session of the terminal is used to determine whether a new Ethernet session needs to be established for the terminal, and the terminal MAC address list supported by the terminal is used to determine whether a new terminal MAC address detected by the terminal is valid.

In an implementation, the obtaining, by the mobility management network element, at least one of a quantity of terminal MAC addresses that can be bound to an Ethernet session of the terminal or a terminal MAC address list supported by the terminal includes: obtaining, by the mobility management network element, at least one of subscription data of the terminal, policy data of the terminal, or data network authentication data of the terminal. At least one of the subscription data of the terminal, the policy data of the terminal, or the data network authentication data of the terminal includes at least one of the quantity of terminal MAC addresses that can be bound to the Ethernet session of the terminal or the terminal MAC address list supported by the terminal.

In the foregoing session management method, for example, for an operation of the mobility management network element, refer to the operation of the AMF network element in FIG. 5 and the foregoing related text descriptions. Details are not described herein again.

In addition, an embodiment of this application further discloses a session management method, including: determining, by a user plane function network element, that a terminal MAC address list that has been bound to an existing Ethernet session of a terminal is full; and sending, by the user plane function network element to a session management network element, indication information indicating that the terminal MAC address list that has been bound to the existing Ethernet session of the terminal is full, where the indication information is used to establish a new Ethernet session for the terminal.

In an implementation, the determining, by a user plane function network element, that a terminal MAC address list that has been bound to an existing Ethernet session of a terminal is full includes: determining, by the user plane function network element, that the terminal MAC address list that has been bound to the existing Ethernet session of the terminal is the same as a terminal MAC address list available for the existing Ethernet session of the terminal.

Optionally, before the determining, by a user plane function network element, that a terminal MAC address list that has been bound to an existing Ethernet session of a terminal is full, the session management method may further include: receiving, by the user plane function network element, a data packet that carries a terminal MAC address; and storing, by the user plane function network element, the terminal MAC address into the terminal MAC address list that has been bound to the existing Ethernet session of the terminal.

In the foregoing session management method, for example, for an operation of the user plane function network element, refer to the operation of the UPF network element in FIG. 7 and the foregoing related text descriptions. Details are not described herein again.

The foregoing mainly describes the solutions provided in the embodiments of this application from a perspective of interaction between the network elements. It may be understood that, to implement the foregoing functions, the terminal, the session management network element, the mobility management network element, or the user plane function network element includes corresponding hardware structures and/or software modules for performing the functions. A person skilled in the art should be easily aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal, the session management network element, the mobility management network element, or the user plane function network element may be divided into function modules based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, division into modules in the embodiments of this application is an example, and is merely a logical function division. In actual implementation, another division manner may be used.

Figure 10:
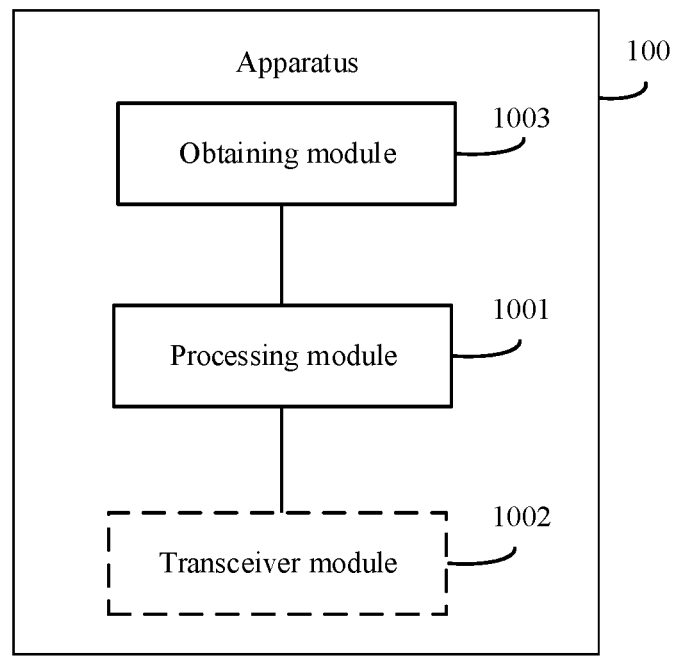
FIG. 10 is a schematic structural diagram of an apparatus according to an embodiment of this application.

For example, when the function modules are obtained through division in an integrated manner, FIG. 10 is a schematic structural diagram of an apparatus 100. The apparatus 100 may be the terminal in the foregoing embodiments, or may be a chip or circuit in the terminal in the foregoing embodiments. This is not specifically limited in this embodiment of this application. The apparatus 100 includes an obtaining module 1003 and a processing module 1001. The obtaining module 1003 is configured to obtain terminal MAC address information related to an existing Ethernet session of the terminal. The processing module 1001 is configured to: determine, based on the terminal MAC address information related to the existing Ethernet session of the terminal, that a new Ethernet session needs to be established for the terminal; and then initiate establishment of a new Ethernet session for the terminal.

In a possible implementation, the terminal MAC address information related to the existing Ethernet session of the terminal includes a terminal MAC address list that has been bound to the existing Ethernet session of the terminal and a quantity of terminal MAC addresses that can be bound to the existing Ethernet session of the terminal. That the processing module 1001 is configured to determine, based on the terminal MAC address information related to the existing Ethernet session of the terminal, that a new Ethernet session needs to be established for the terminal includes: determining that a quantity of terminal MAC addresses in the terminal MAC address list that has been bound to the existing Ethernet session of the terminal is equal to the quantity of terminal MAC addresses that can be bound to the existing Ethernet session of the terminal.

Further, that the obtaining module 1003 is configured to obtain a quantity of terminal MAC addresses that can be bound to the existing Ethernet session of the terminal includes: obtaining a preconfigured quantity of terminal MAC addresses that can be bound to the existing Ethernet session of the terminal.

Alternatively, optionally, that the obtaining module 1003 is configured to obtain a quantity of terminal MAC addresses that can be bound to the existing Ethernet session of the terminal includes: receiving a registration accept message from a mobility management network element, where the registration accept message carries the quantity of terminal MAC addresses that can be bound to the existing Ethernet session of the terminal.

Alternatively, optionally, that the obtaining module 1003 is configured to obtain a quantity of terminal MAC addresses that can be bound to the existing Ethernet session of the terminal includes: receiving a session establishment accept message from a session management network element, where the session establishment accept message carries the quantity of terminal MAC addresses that can be bound to the existing Ethernet session of the terminal.

Optionally, the obtaining module 1003 is further configured to: obtain a terminal MAC address list supported by the terminal; and when a new terminal MAC address is detected, determine that the new terminal MAC address is in the terminal MAC address list supported by the terminal.

Alternatively, optionally, as shown in FIG. 10, the apparatus 100 further includes a transceiver module 1002. The transceiver module 1002 is configured to receive a terminal MAC address from a network side. The processing module 1001 is further configured to store the terminal MAC address from the network side into the terminal MAC address list that has been bound to the existing Ethernet session of the terminal.

In another possible implementation, the terminal MAC address information related to the existing Ethernet session of the terminal includes: a terminal MAC address list available for the existing Ethernet session of the terminal. That the processing module 1001 is configured to determine, based on the terminal MAC address information related to the existing Ethernet session of the terminal, that a new Ethernet session needs to be established for the terminal includes: when a new terminal MAC address is detected, determining that the new terminal MAC address is not in the terminal MAC address list available for the existing Ethernet session of the terminal.

In still another possible implementation, the terminal MAC address information related to the existing Ethernet session of the terminal includes: the terminal MAC address list available for the existing Ethernet session of the terminal and the terminal MAC address list that has been bound to the existing Ethernet session of the terminal. That the processing module 1001 is configured to determine, based on the terminal MAC address information related to the existing Ethernet session of the terminal, that a new Ethernet session needs to be established for the terminal includes: determining that the terminal MAC address list available for the existing Ethernet session of the terminal is the same as the terminal MAC address list that has been bound to the existing Ethernet session of the terminal.

In still yet another implementation, the terminal MAC address information related to the existing Ethernet session of the terminal includes: indication information indicating that the terminal MAC address list that has been bound to the existing Ethernet session of the terminal is full.

Optionally, that the obtaining module 1003 is configured to obtain indication information indicating that the terminal MAC address list that has been bound to the existing Ethernet session of the terminal is full includes: receiving, from the session management network element, the indication information indicating that the terminal MAC address list that has been bound to the existing Ethernet session of the terminal is full.

All related content of the steps in the foregoing method embodiments may be cited in function descriptions of corresponding function modules. Details are not described herein again.

In this embodiment, the apparatus 100 is presented in a form of function modules obtained through division in an integrated manner. The "module" herein may be a specific ASIC, a circuit, a processor executing one or more software or firmware programs, a memory, an integrated logic circuit, and/or another device that can provide the foregoing function.

In a simple embodiment, a person skilled in the art may figure out that the apparatus 100 may be in the form shown in FIG. 4.

For example, the processor 401 in FIG. 4 may invoke the computer-executable instruction stored in the memory 403, to enable the apparatus 100 to perform the session management method in the foregoing method embodiments.

Functions/implementation processes of the processing module 1001, the transceiver module 1002, and the obtaining module 1003 in FIG. 10 may be implemented by the processor 401 in FIG. 4 by invoking the computer-executable instruction stored in the memory 403. Alternatively, functions/implementation processes of the processing module 1001 and the obtaining module 1003 in FIG. 10 may be implemented by the processor 401 in FIG. 4 by invoking the computer-executable instruction stored in the memory 403, and a function/an implementation process of the transceiver module 1002 in FIG. 10 may be implemented by the communications interface 403 in FIG. 4.

Optionally, when the apparatus 100 is the chip or the circuit, the memory 403 may be a storage unit in the chip or the circuit, for example, a register or a cache. Certainly, when the apparatus 100 is the terminal, the memory 403 may be a storage unit that is located outside the chip in the terminal. This is not specifically limited in this embodiment of this application.

The apparatus provided in this embodiment of this application may be configured to perform the foregoing session management method. Therefore, for a technical effect that can be achieved by the apparatus, refer to the foregoing method embodiment. Details are not described herein.

Figure 11:
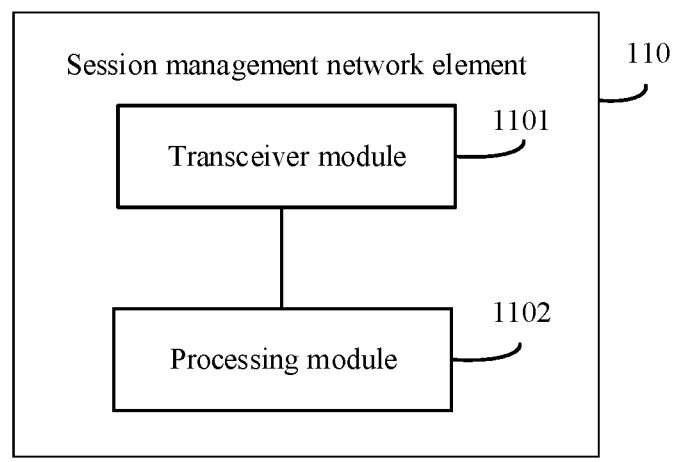
FIG. 11 is a schematic structural diagram of a session management network element according to an embodiment of this application.

For example, when the function modules are obtained through division in an integrated manner, FIG. 11 is a schematic structural diagram of a session management network element 110. The session management network element 110 includes a transceiver module 1101 and a processing module 1102.

The processing module 1102 is configured to obtain terminal MAC address information related to an Ethernet session of a terminal. The transceiver module 1101 is configured to send the terminal MAC address information related to the Ethernet session of the terminal to the terminal, where the terminal MAC address information related to the Ethernet session of the terminal is used by the terminal to determine whether a new Ethernet session needs to be established for the terminal.

In a possible implementation, the terminal MAC address information related to the Ethernet session of the terminal includes a quantity of terminal MAC addresses that can be bound to the Ethernet session of the terminal. That the processing module 1102 is configured to obtain terminal MAC address information related to an Ethernet session of a terminal includes: obtaining a local policy, subscription data of the terminal, policy data of the terminal, or data network authentication data of the terminal, where the local policy, the subscription data of the terminal, the policy data of the terminal, or the data network authentication data of the terminal includes the quantity of terminal MAC addresses that can be bound to the Ethernet session of the terminal.

In another possible implementation, the terminal MAC address information related to the Ethernet session of the terminal includes indication information indicating that a terminal MAC address list that has been bound to the existing Ethernet session of the terminal is full. That the processing module 1102 is configured to obtain terminal MAC address information related to an Ethernet session of a terminal includes: receiving, from a user plane function network element, the indication information indicating that the terminal MAC address list that has been bound to the existing Ethernet session of the terminal is full.

All related content of the steps in the foregoing method embodiments may be cited in function descriptions of corresponding function modules. Details are not described herein again.

In this embodiment, the session management network element 110 is presented in a form of function modules obtained through division in an integrated manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the session management network element 110 may be in the form shown in FIG. 4.

For example, the processor 401 in FIG. 4 may invoke the computer-executable instruction stored in the memory 403, to enable the session management network element 110 to perform the packet transmission method in the foregoing method embodiments.

Functions/implementation processes of the transceiver module 1101 and the processing module 1102 in FIG. 11 may be implemented by the processor 401 in FIG. 4 by invoking the computer-executable instruction stored in the memory 403. Alternatively, a function/an implementation process of the processing module 1102 in FIG. 11 may be implemented by the processor 401 in FIG. 4 by invoking the computer-executable instruction stored in the memory 403, and a function/an implementation process of the transceiver module 1101 in FIG. 11 may be implemented by the communications interface 403 in FIG. 4.

The session management network element provided in this embodiment of this application can perform the foregoing session management method. Therefore, for a technical effect that can be achieved by the session management network element, refer to the foregoing method embodiment. Details are not described herein again.

Optionally, an embodiment of this application further provides a chip system. The chip system includes a processor, configured to support a session management network element in implementing the foregoing session management method, for example, obtaining terminal MAC address information related to an Ethernet session of a terminal. In a possible design, the chip system further includes a memory. The memory is configured to store a program instruction and data that are necessary for the session management network element. Certainly, the memory may alternatively not be in the chip system. The chip system may include a chip, or may include a chip and another discrete device. This is not specifically limited in this embodiment of this application.

Figure 12:
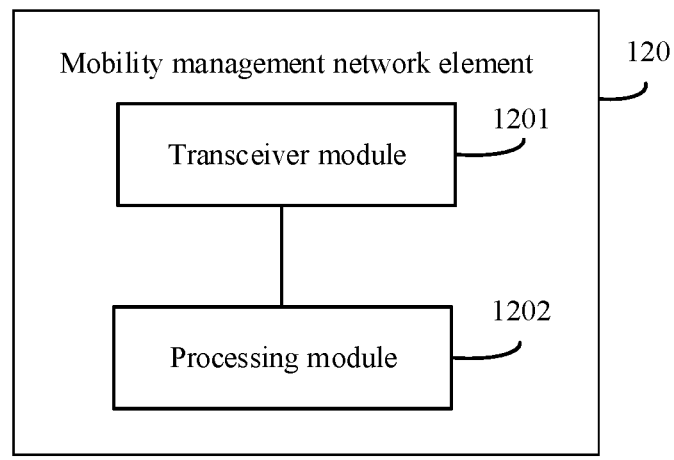
FIG. 12 is a schematic structural diagram of a mobility management network element according to an embodiment of this application.

For example, when the function modules are obtained through division in an integrated manner, FIG. 12 is a schematic structural diagram of a mobility management network element 120. The mobility management network element 120 includes a transceiver module 1201 and a processing module 1202.

The transceiver module 1201 is configured to receive a registration request from a terminal. The processing module 1202 is configured to obtain at least one of a quantity of terminal MAC addresses that can be bound to an Ethernet session of the terminal or a terminal MAC address list supported by the terminal. The transceiver module 1201 is further configured to send a registration response to the terminal, where the registration response carries at least one of the quantity of terminal MAC addresses that can be bound to the Ethernet session of the terminal or the terminal MAC address list supported by the terminal. The quantity of terminal MAC addresses that can be bound to the Ethernet session of the terminal is used to determine whether a new Ethernet session needs to be established for the terminal, and the terminal MAC address list supported by the terminal is used to determine whether a new terminal MAC address detected by the terminal is valid.

Optionally, that the processing module 1202 is configured to obtain at least one of a quantity of terminal MAC addresses that can be bound to an Ethernet session of the terminal or a terminal MAC address list supported by the terminal includes: obtaining at least one of subscription data of the terminal, policy data of the terminal, or data network authentication data of the terminal, where at least one of the subscription data of the terminal, the policy data of the terminal, or the data network authentication data of the terminal includes at least one of the quantity of terminal MAC addresses that can be bound to the Ethernet session of the terminal or the terminal MAC address list supported by the terminal.

All related content of the steps in the foregoing method embodiments may be cited in function descriptions of corresponding function modules. Details are not described herein again.

In this embodiment, the mobility management network element 120 is presented in a form of function modules obtained through division in an integrated manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the mobility management network element 120 may be in the form shown in FIG. 4.

For example, the processor 401 in FIG. 4 may invoke the computer-executable instruction stored in the memory 403, to enable the mobility management network element 120 to perform the packet transmission method in the foregoing method embodiments.

Functions/implementation processes of the transceiver module 1201 and the processing module 1202 in FIG. 12 may be implemented by the processor 401 in FIG. 4 by invoking the computer-executable instruction stored in the memory 403. Alternatively, a function/an implementation process of the processing module 1202 in FIG. 12 may be implemented by the processor 401 in FIG. 4 by invoking the computer-executable instruction stored in the memory 403, and a function/an implementation process of the transceiver module 1201 in FIG. 12 may be implemented by the communications interface 403 in FIG. 4.

The mobility management network element provided in this embodiment of this application can perform the foregoing session management method. Therefore, for a technical effect that can be achieved by the mobility management network element, refer to the foregoing method embodiment. Details are not described herein again.

Optionally, an embodiment of this application further provides a chip system. The chip system includes a processor, configured to support a mobility management network element in implementing the foregoing session management method, for example, obtaining at least one of a quantity of terminal MAC addresses that can be bound to an Ethernet session of a terminal or a terminal MAC address list supported by the terminal. In a possible design, the chip system further includes a memory. The memory is configured to store a program instruction and data that are necessary for the mobility management network element. Certainly, the memory may alternatively not be in the chip system. The chip system may include a chip, or may include a chip and another discrete device. This is not specifically limited in this embodiment of this application.

Figure 13:
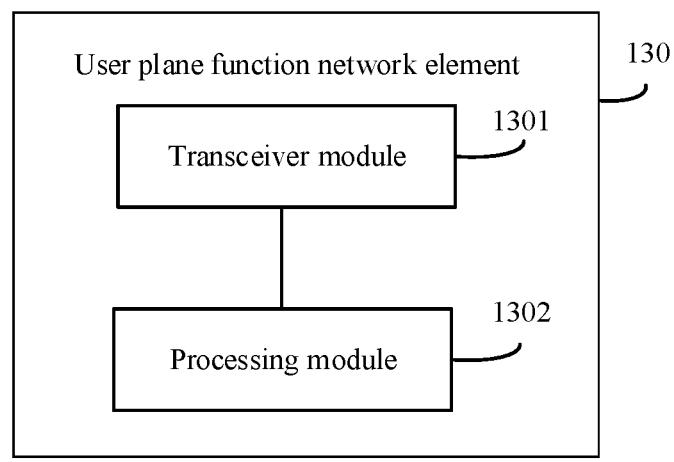
FIG. 13 is a schematic structural diagram of a user plane function network element according to an embodiment of this application.

For example, when the function modules are obtained through division in an integrated manner, FIG. 13 is a schematic structural diagram of a user plane function network element 130. The user plane function network element 130 includes a transceiver module 1301 and a processing module 1302.

The processing module 1302 is configured to determine that a terminal MAC address list that has been bound to an existing Ethernet session of a terminal is full. The transceiver module 1301 is configured to send, to a session management network element, indication information indicating that the terminal MAC address list that has been bound to the existing Ethernet session of the terminal is full, where the indication information is used to establish a new Ethernet session for the terminal.

Optionally, that the processing module 1302 is configured to determine that a terminal MAC address list that has been bound to an existing Ethernet session of a terminal is full includes: determining that the terminal MAC address list that has been bound to the existing Ethernet session of the terminal is the same as a terminal MAC address list available for the existing Ethernet session of the terminal.

Optionally, the transceiver module 1301 is further configured to receive a data packet that carries a terminal MAC address. The processing module 1302 is further configured to store the terminal MAC address into the terminal MAC address list that has been bound to the existing Ethernet session of the terminal.

All related content of the steps in the foregoing method embodiments may be cited in function descriptions of corresponding function modules. Details are not described herein again.

In this embodiment, the user plane function network element 130 is presented in a form of function modules obtained through division in an integrated manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the user plane function network element 130 may be in the form shown in FIG. 4.

For example, the processor 401 in FIG. 4 may invoke the computer-executable instruction stored in the memory 403, to enable the user plane function network element 130 to perform the packet transmission method in the foregoing method embodiments.

Functions/implementation processes of the transceiver module 1301 and the processing module 1302 in FIG. 13 may be implemented by the processor 401 in FIG. 4 by invoking the computer-executable instruction stored in the memory 403. Alternatively, a function/an implementation process of the processing module 1302 in FIG. 13 may be implemented by the processor 401 in FIG. 4 by invoking the computer-executable instruction stored in the memory 403, and a function/an implementation process of the transceiver module 1301 in FIG. 13 may be implemented by the communications interface 403 in FIG. 4.

The user plane function network element provided in this embodiment of this application can perform the foregoing session management method. Therefore, for a technical effect that can be achieved by the user plane function network element, refer to the foregoing method embodiment. Details are not described herein again.

Optionally, an embodiment of this application further provides a chip system. The chip system includes a processor, configured to support a user plane function network element in implementing the foregoing session management method, for example, determining that a terminal MAC address list that has been bound to an existing Ethernet session of a terminal is full. In a possible design, the chip system further includes a memory. The memory is configured to store a program instruction and data that are necessary for the user plane function network element. Certainly, the memory may alternatively not be in the chip system. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, certainly, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Certainly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A session management method, comprising:
   obtaining, by a terminal, terminal media access control (MAC) address information related to an existing Ethernet session of the terminal, wherein the terminal MAC address information related to the existing Ethernet session of the terminal comprises a terminal MAC address list available for the existing Ethernet session of the terminal;
   in response to determining, by the terminal based on the terminal detecting a new terminal MAC address, that the new terminal MAC address is not in the terminal MAC address list available for the existing Ethernet session of the terminal, determining, by the terminal, that a new Ethernet session needs to be established for the terminal; and
   initiating, by the terminal, establishment of the new Ethernet session for the terminal.

2. The method according to claim 1, wherein
   the terminal MAC address list has been bound to the existing Ethernet session of the terminal and the terminal MAC address information further comprises a quantity of terminal MAC addresses available to be bound to the existing Ethernet session of the terminal, and
   the determining, by the terminal, that the new Ethernet session needs to be established for the terminal is further based on a determination, by the terminal, that a quantity of terminal MAC addresses in the terminal MAC address list that has been bound to the existing Ethernet session of the terminal is equal to the quantity of terminal MAC addresses available to be bound to the existing Ethernet session of the terminal.

3. The method according to claim 2, wherein the obtaining, by the terminal, of the quantity of terminal MAC addresses available to be bound to the existing Ethernet session of the terminal comprises:
   obtaining, by the terminal, a preconfigured quantity of terminal MAC addresses available to be bound to the existing Ethernet session of the terminal; or
   receiving, by the terminal, a registration accept message from a mobility management network element, wherein the registration accept message carries the quantity of terminal MAC addresses available to be bound to the existing Ethernet session of the terminal; or
   receiving, by the terminal, a session establishment accept message from a session management network element, wherein the session establishment accept message carries the quantity of terminal MAC addresses available to be bound to the existing Ethernet session of the terminal.

4. The method according to claim 2, wherein the method further comprises:
   obtaining, by the terminal, a terminal MAC address list supported by the terminal; and
   determining, by the terminal based on the terminal detecting the new terminal MAC address, that the new terminal MAC address is in the terminal MAC address list supported by the terminal.

5. The method according to claim 2, wherein the method further comprises:
   receiving, by the terminal, a terminal MAC address from a network side; and
   storing, by the terminal, the terminal MAC address from the network side into the terminal MAC address list that has been bound to the existing Ethernet session of the terminal.

6. The method according to claim 1, wherein the terminal MAC address information related to the existing Ethernet session of the terminal further comprises a terminal MAC address list that has been bound to the existing Ethernet session of the terminal, and
   the determining, by the terminal, that the new Ethernet session needs to be established for the terminal is further based on a determination, by the terminal, that the terminal MAC address list available for the existing Ethernet session of the terminal is identical to the terminal MAC address list that has been bound to the existing Ethernet session of the terminal.

7. A terminal, comprising:
   at least one processor, and
   a non-transitory computer-readable storage medium storing programming for execution by the at least one processor having processor-executable instructions stored thereon that, when executed by the at least one processor, cause the terminal to:
   obtain terminal media access control (MAC) address information related to an existing Ethernet session of the terminal, wherein the terminal MAC address information related to the existing Ethernet session of the terminal comprises a terminal MAC address list available for the existing Ethernet session of the terminal;
   in response to determining, based on the terminal detecting a new terminal MAC address, that the new terminal MAC address is not in the terminal MAC address list available for the existing Ethernet session of the terminal, determine that a new Ethernet session needs to be established for the terminal; and
   initiate establishment of the new Ethernet session for the terminal.

8. The terminal according to claim 7, wherein
   the terminal MAC address list has been bound to the existing Ethernet session of the terminal and the terminal MAC address information further comprises a quantity of terminal MAC addresses available to be bound to the existing Ethernet session of the terminal, and
   the terminal is further caused to:

determine that a quantity of terminal MAC addresses in the terminal MAC address list that has been bound to the existing Ethernet session of the terminal is equal to the quantity of terminal MAC addresses available to be bound to the existing Ethernet session of the terminal.

9. The terminal according to claim 8, wherein the terminal is further caused to:
obtain a preconfigured quantity of terminal MAC addresses available to be bound to the existing Ethernet session of the terminal; or
receive a registration accept message from a mobility management network element, wherein the registration accept message carries the quantity of terminal MAC addresses available to be bound to the existing Ethernet session of the terminal; or
receive a session establishment accept message from a session management network element, wherein the session establishment accept message carries the quantity of terminal MAC addresses available to be bound to the existing Ethernet session of the terminal.

10. The terminal according to claim 8, wherein the terminal is further caused to:
obtain a terminal MAC address list supported by the terminal; and
determine, based on the terminal detecting the new terminal MAC address, that the new terminal MAC address is in the terminal MAC address list supported by the terminal.

11. The terminal according to claim 8, wherein the terminal is further caused to:
receive a terminal MAC address from a network side; and
store the terminal MAC address from the network side into the terminal MAC address list that has been bound to the existing Ethernet session of the terminal.

12. The terminal according to claim 7, wherein
the terminal MAC address information related to the existing Ethernet session of the terminal further comprises a terminal MAC address list that has been bound to the existing Ethernet session of the terminal, and
the terminal is further caused to:
determine that the terminal MAC address list available for the existing Ethernet session of the terminal is identical to the terminal MAC address list that has been bound to the existing Ethernet session of the terminal.

\* \* \* \* \*